SWITCHING SYSTEM USING CONDENSER STORAGE OF DIGITS

Filed July 21, 1953 11 Sheets-Sheet 1

FIG. 3, PART I
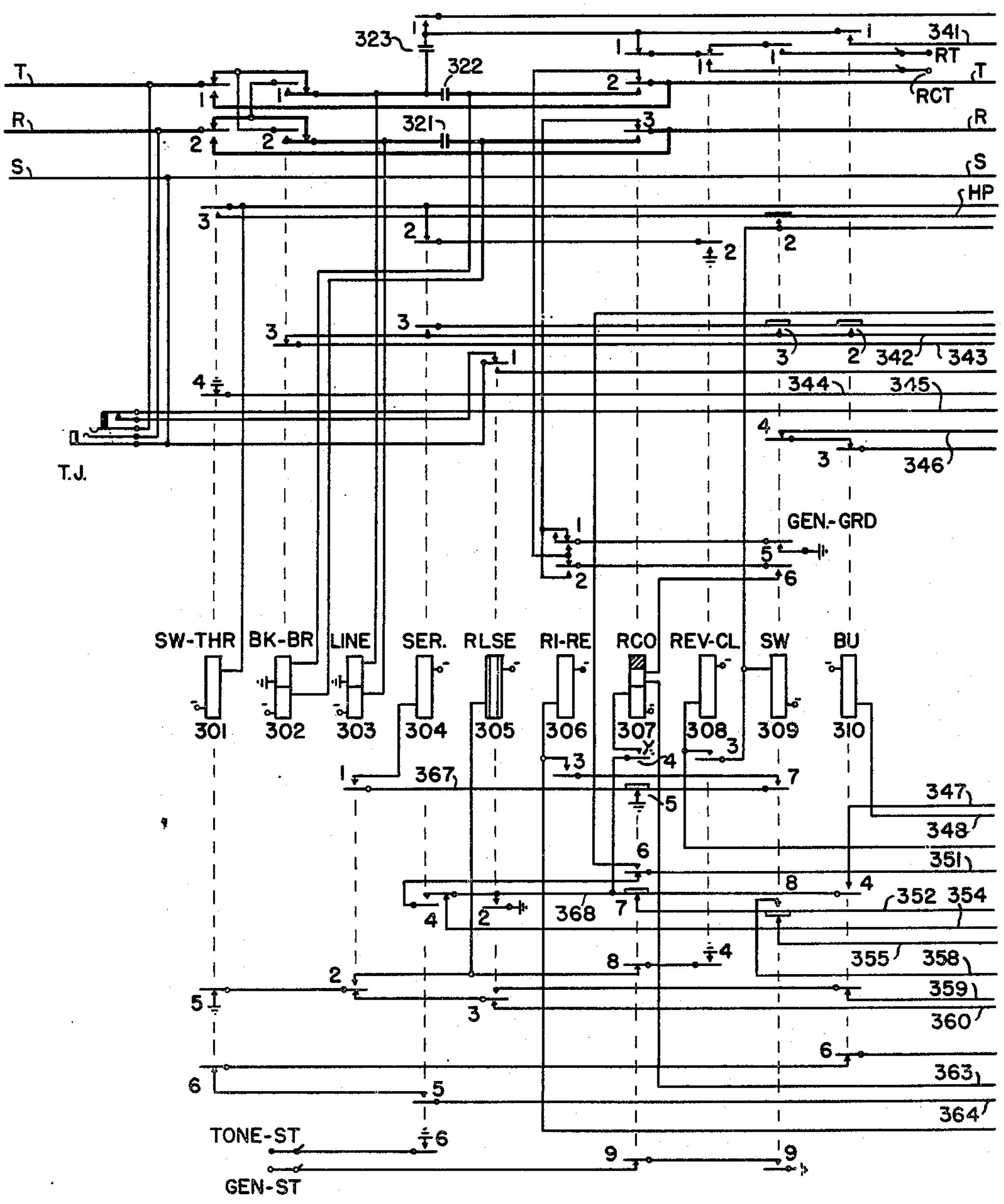

FIG. 3, PART 2
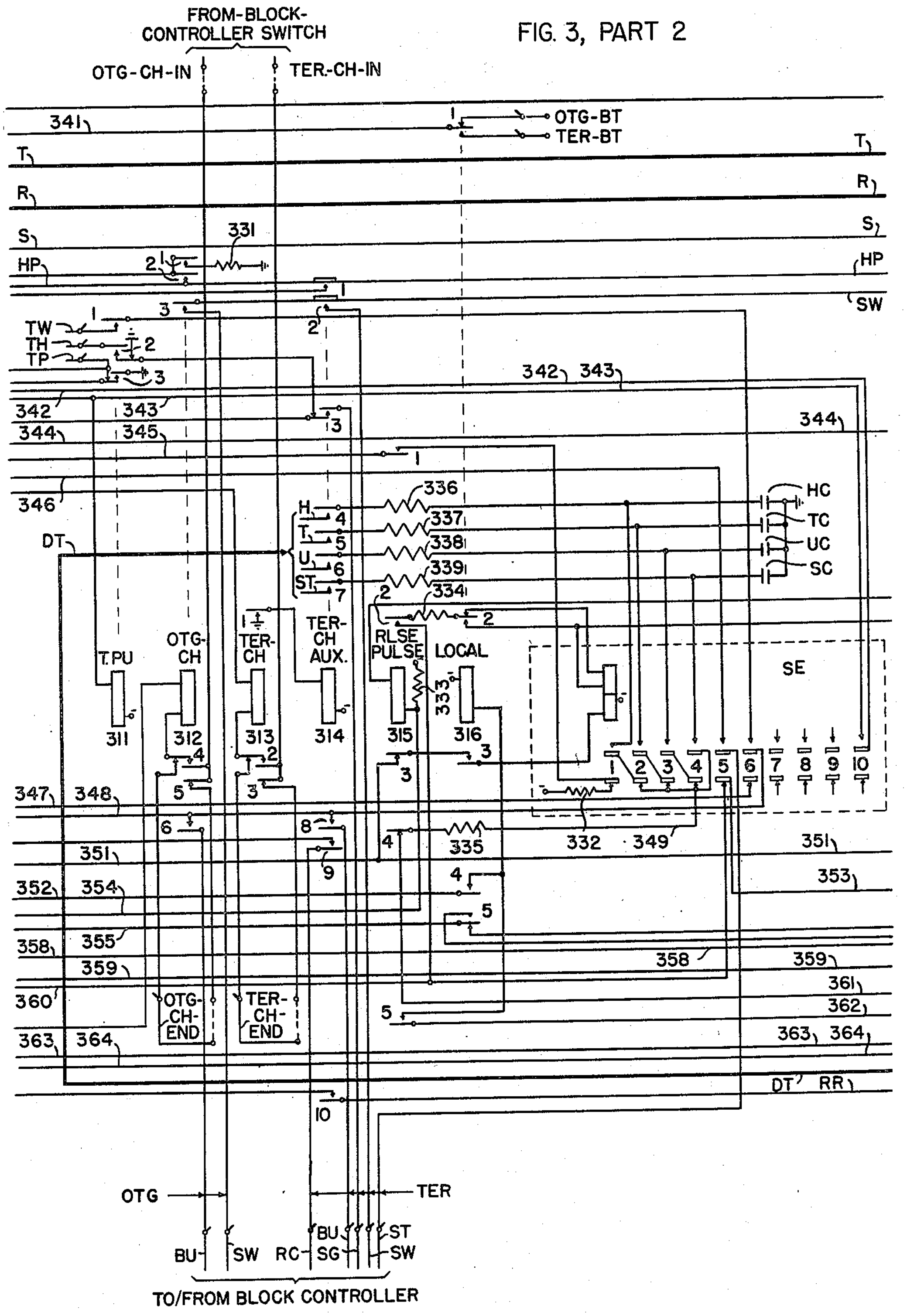

Jan. 18, 1955 P. W. HEMMINGER ET AL 2,700,071
SWITCHING SYSTEM USING CONDENSER STORAGE OF DIGITS
Filed July 21, 1953 11 Sheets-Sheet 4
FIG. 3, PART 3
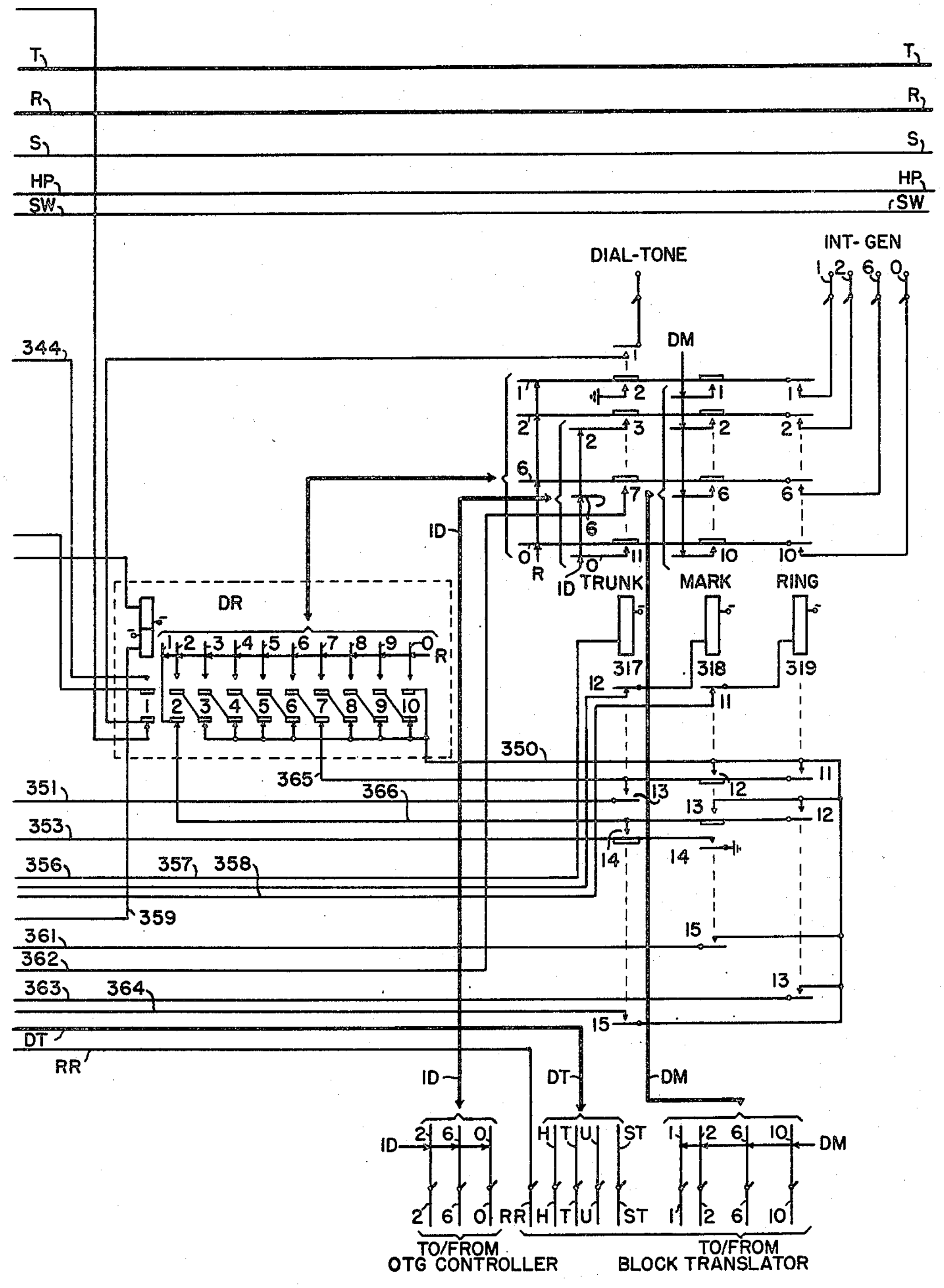

Jan. 18, 1955 P. W. HEMMINGER ET AL 2,700,071

SWITCHING SYSTEM USING CONDENSER STORAGE OF DIGITS

Filed July 21, 1953 11 Sheets-Sheet 5

SWITCHING SYSTEM USING CONDENSER STORAGE OF DIGITS

Filed July 21, 1953 11 Sheets-Sheet 6

SWITCHING SYSTEM USING CONDENSER STORAGE OF DIGITS
Filed July 21, 1953 
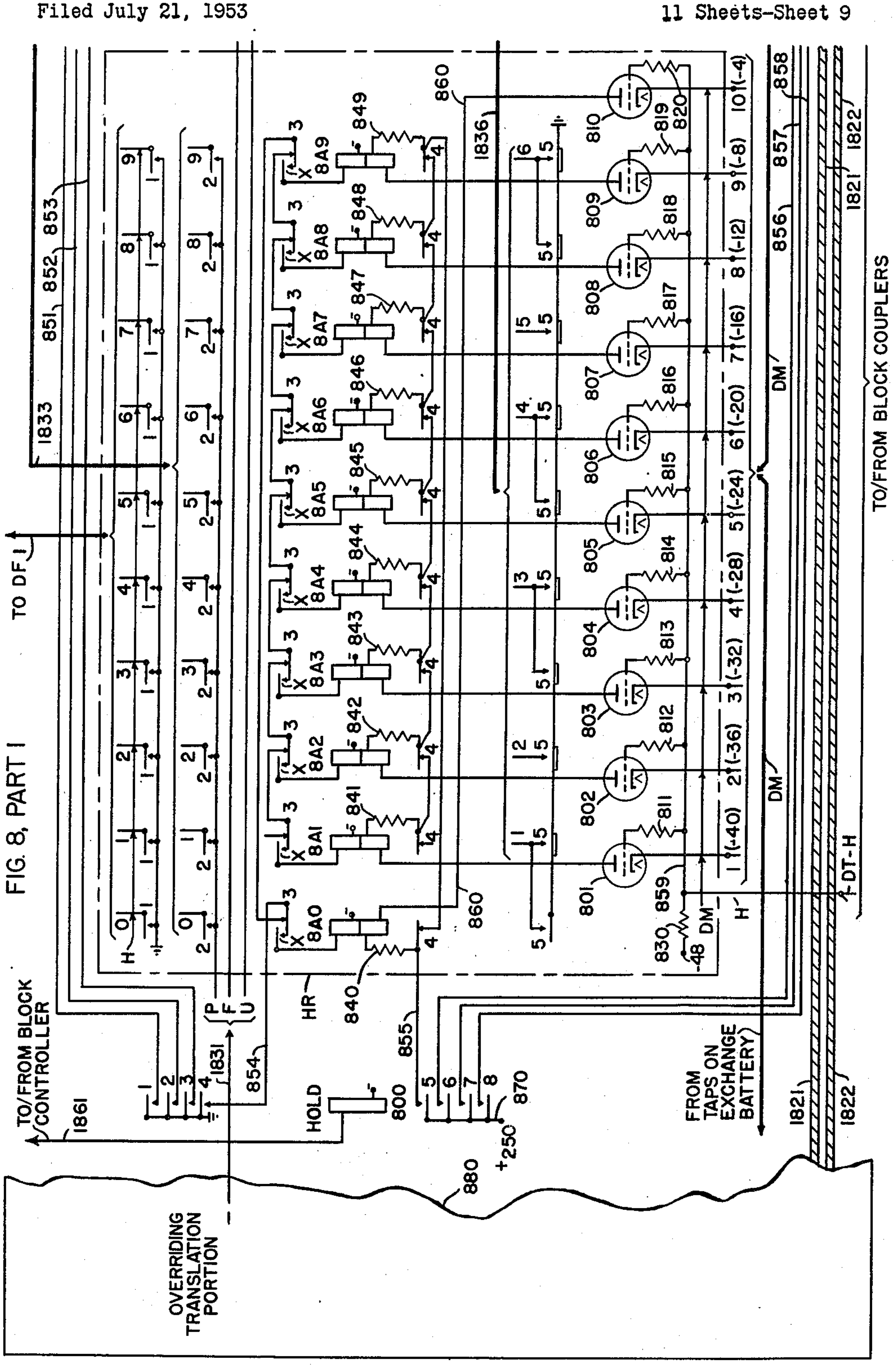
FIG. 8, PART I

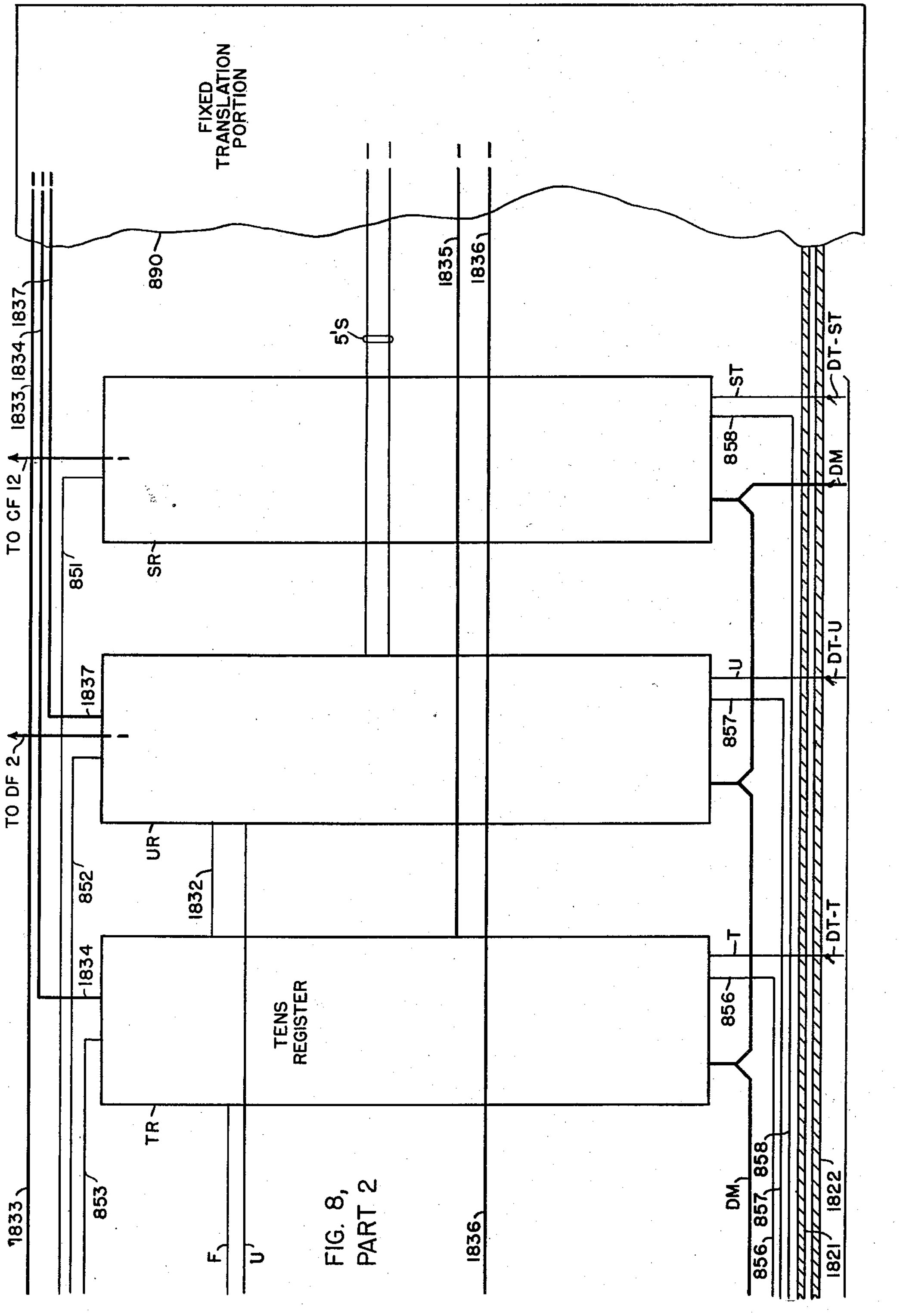
FIG. 8, PART 2

United States Patent Office 2,700,071
Patented Jan. 18, 1955

2,700,071

SWITCHING SYSTEM USING CONDENSER STORAGE OF DIGITS

Paul W. Hemminger, Franklin Park, and John I. Bellamy, Wheaton, Ill., assignors to International Telephone and Telegraph Corporation, a corporation of Maryland Application July 21, 1953, Serial No. 369,342

20 Claims. (Cl. 179—18)

This invention relates to a switching system using condenser storage of digits. The principal object is to provide a reliable storage arrangement permitting a substanial reduction in the apparatus required for the registration and storage of the called digits of telephone numbers. According to the invention, this is achieved by providing a series of condensers at each storage location and means for charging each to a potential corresponding to the value of a separate digit of a called telephone number, and by providing suitable potential-responsive means common to the several storage locations for thereafter converting the digit signals represented by the respective potentials of the charged condensers into a usable form for controlling the operation of the switching apparatus.

I. GENERAL DESCRIPTION

It has been chosen to disclose the invention as applied to the telephone switching system disclosed in the application of Bellamy et al. for a Primary-Secondary-Spread Crossbar Telephone System, Serial No. 85,292, filed April 4, 1949, (now Patent No. 2,674,657,) which will hereinafter be termed the "former" application.

The noted former application discloses a 1000-line automatic telephone exchange which comprises crossbar switching apparatus and associated control apparatus mounted on four line-link frames and a block-link frame. The line-link frames each serves 250 lines, and the block-link frame serves the four line-link frames in common in that it handles all calls originating at, or terminating at, any line-link frame. For this purpose, groups of originating trunks extend from the respective line-link frames to the block-link frame, and groups terminating trunks extend from the block-link frame to the respective line-link frames.

Trunked calls incoming to, and outgoing from, the 1000-line exchange are handled by incoming and outgoing trunks connected to the block-link frame. The trunks carrying traffic to the block-link frame are thus both the noted originating trunks and the noted incoming trunks. Each such entering trunk is provided with a control organization, termed a block coupler, for effectively coupling that trunk directly or indirectly to the switching and control apparatus and current sources of the block-link frame. A block coupler includes a number of control relays and sufficient registering and storage apparatus for registering and storing the digits of a five-digit telephone number responsive to the receipt of respectively corresponding series of dialed impulses.

The first digit received at a seized block coupler is termed the initial digit (ID). The value of this digit indicates whether the call is for a local line of the exchange or is for a line of another exchange. If this digit indexes another exchange, the call is an outgoing call. Common apparatus (block and outgoing controllers) on the block-link frame is thereupon called in to operate the switching apparatus of that frame to extend the connection to an idle outgoing trunk in the concerned group during the usual inter-digit interval. When the initial digit indexes the local group of one thousand lines, the call is a terminating call. No call-in operation then occurs until the remaining four digits of the called number are registered and stored. These remaining digits are termed hundreds, tens, units, and stations digits (H, T, U, and ST). Thus, for a terminating call, the five digits ID, H, T, U, and ST must be registered and stored in the block coupler before the common apparatus (block controller and block translator) on the block-link frame is called in to extend the connection to the locally terminated line indicated by the stored five-digit number.

In the noted former application, each block coupler includes five digit registers, each comprising a separate electromagnetic impulse counter, for registering the required five digits and storing them until used. Specific objects of this invention are (1) to reduce the quantity and cost of the registering and storage apparatus of the noted block couplers by storing as many of the received digits as practicable on respective storage condensers, and (2) to provide condenser-controlled apparatus associated with the common block translator for converting any stored digit-value potential on a storage condenser into a current flow in a corresponding digit wire of the block translator.

Desirable features of the chosen embodiment of the invention include the following:

1. Any digit to be stored in a block coupler on a storage condenser is first registered on an electromechanical digit register which selects a corresponding potential source (battery tap) for charging the condenser to a potential corresponding to the registering digit value to be stored thereon.

2. The same digit register (electromagnetic counting device) is used for each digit to be condenser-stored in a block coupler, being cleared out following the charging of the concerned storage condenser and preceding the start of the impulse series of the next digit to be stored.

3. The first digit registered (the initial digit) is not condenser stored but is used directly by the digit register to control the outgoing trunking operation (over a selected initial-digit wire), or to operate a local relay in the block coupler, depending upon whether the first digit indexes on outgoing trunk group or indexes the local block of 1000 lines.

4. The final registered digit in the number of a local line (the stations digit) is condenser-stored for the transmission of station information to the block translator, but the digit register remains set nevertheless to control the application of ringing current to the called line after the desired connection has been established.

5. In order to enable the common digit register to effect selection at the proper time among the wires of three groups (initial-digit, marking, and ringing wires), respective connecting relays are operated and restored in required sequence during the process of registering, storing, and forwarding the digits of a number.

6. In order to practically preclude the likelihood of the storage condensers in two block couplers mutually altering their storage potentials by interchange of current, as would occur to some extent if they were connected even momentarily to the same respective digit-transfer wires leading to the translator, each block coupler is provided with an adjustment-retarded auxiliary relay which is operated by the terminating-chain relay to close the storage condensers respectively to the common digit-transfer wires. Thereby, a momentarily operated terminating-chain relay which is restored by the operation therewith of a terminating chain relay having a preferred position in the chain restores without having caused its associated storage condensers to become momentarily connected to the common digit-transfer wires.

7. The one of the ten direct-current digit-value potentials which is stored on any one of the four storage condensers is converted by providing ten triodes having their control electrodes connected in common to the concerned digit-transfer wire, and having their cathodes connected respectively to successive ones of the same potential-sources marking wires used at the couplers for charging the condensers. Thereby, the first marking potential (most negative, as for the digit 1) stored on a condenser permits only the first triode to conduct; the second marking potential permits the second triode to conduct also; and so on to the tenth marking potential which permits all triodes of the digit group to conduct. Relays connected in the anode circuits of the respective triodes are thereby positioned according to the stored digit value.

8. To permit all four stored digits to be converted and transmitted to the block-translator at the same time, four digit groups of converting triodes are provided.

9. In order to conserve relays, the relays connected respectively in the anodes of the converter triodes comprise the digit relays of the block translator itself, thus comprising forty relays in four groups of ten for recording the converted hundreds, tens, units, and stations digits respectively. The operating circuits of the relays of any such group of ten are so interchanged that only the highest numbered relay which operates is able to remain operated, for each such relay succeeding the first open-circuits any preceding one, whereby the translator-control contacts of these relays do not require interchaining.

Additional objects and features of this invention will appear as the description progresses.

A. *The drawings*

The accompanying drawings, comprising Figs. 1 to 8, illustrate sufficient of the apparatus in a system embodying the invention to enable the invention to be understood, as follows:

Fig. 3 shows the detailed circuit arrangement of a block coupler adapted according to the invention;

Figures 1, 2:
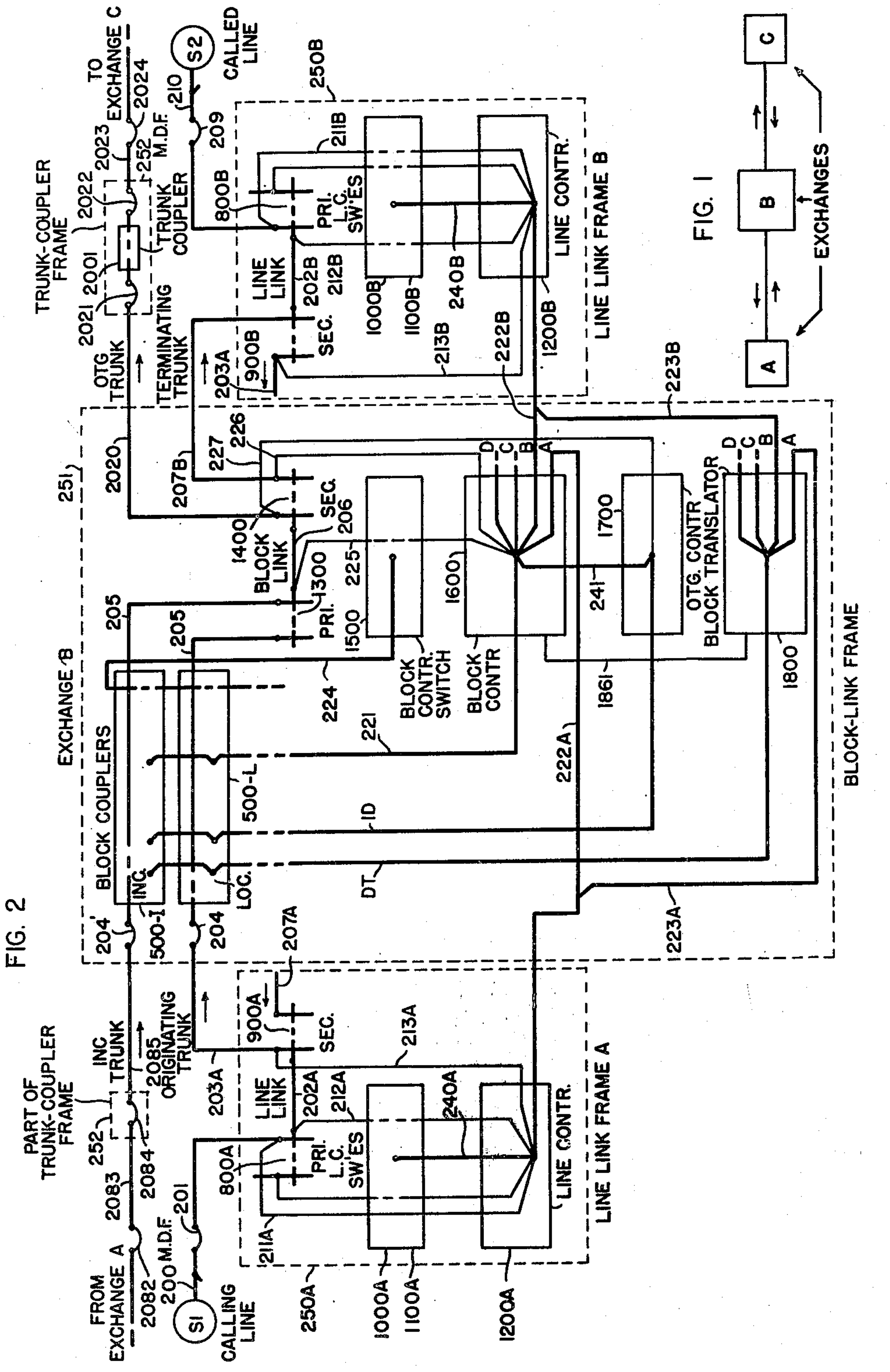
Fig. 1 shows three interconnected telephone exchanges A, B, and C, of which exchange B contains telephone switchboard apparatus embodying the features of the invention.
Fig. 2 is a single-line block diagram of apparatus in exchange B which is employed in extending connections to and from lines of the exchange and in extending connections to and from trunks interconnecting exchange B with exchanges A and C.
Figure 4:
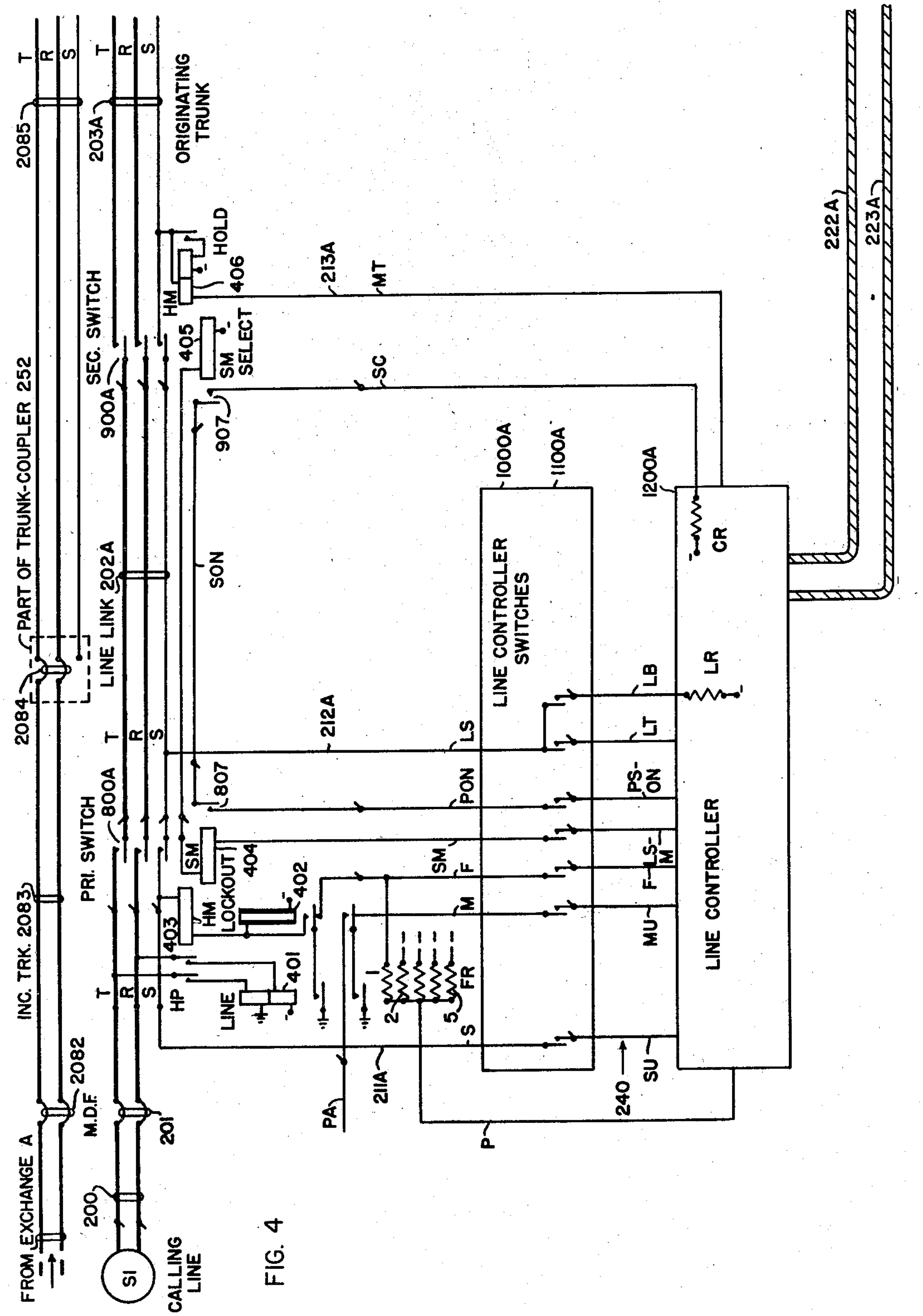
Figure 5:
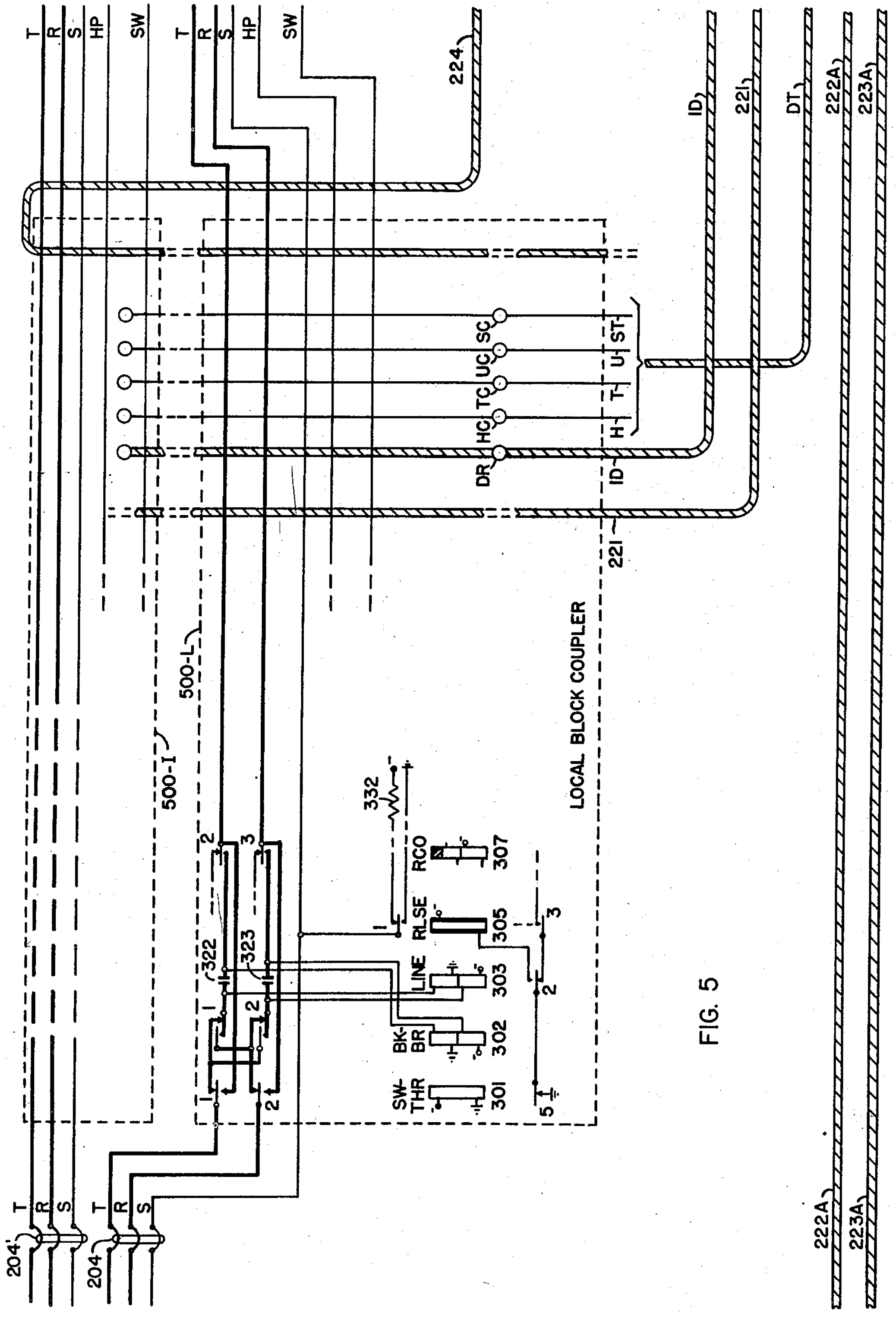
Figure 6:
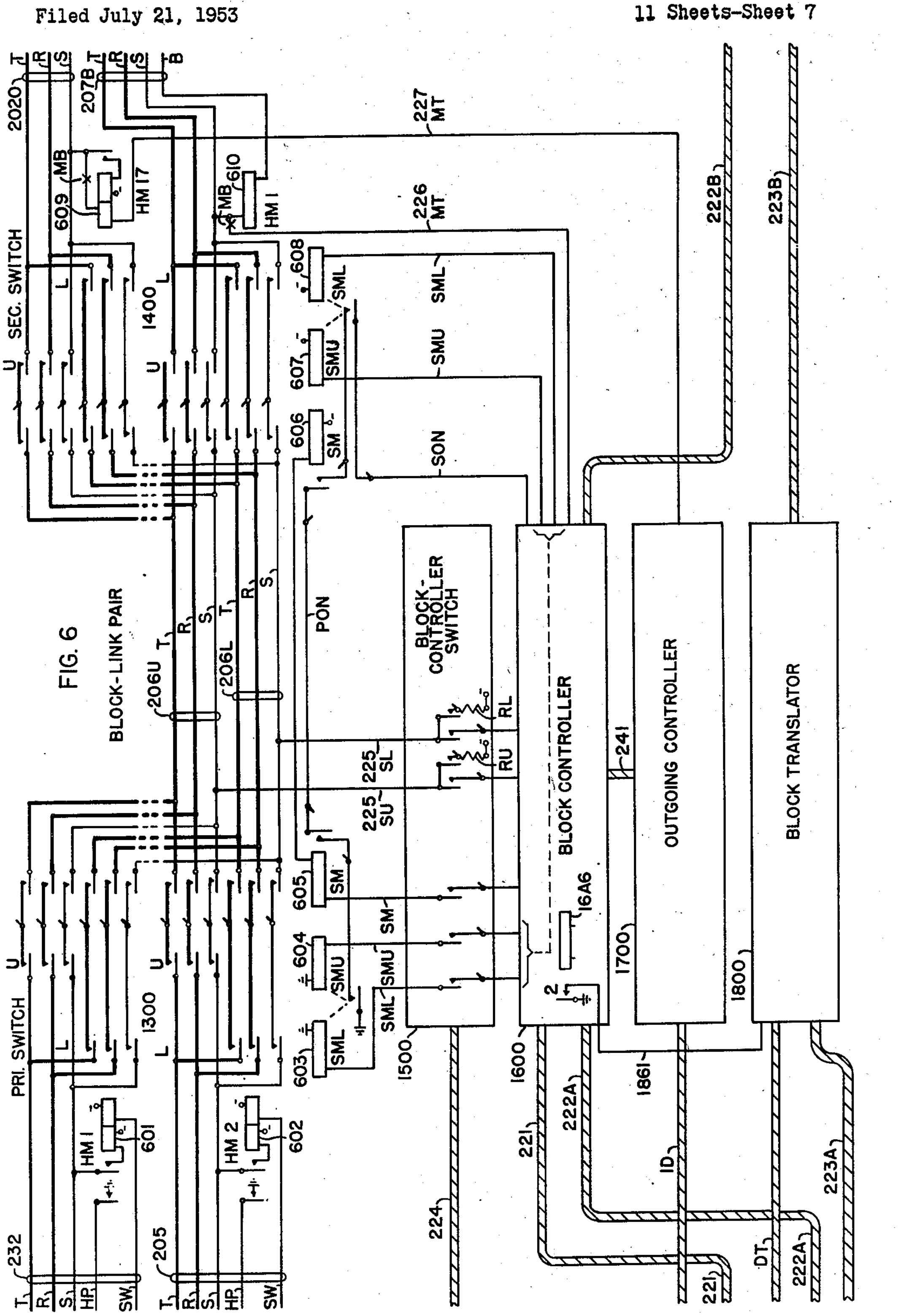
Figure 7:
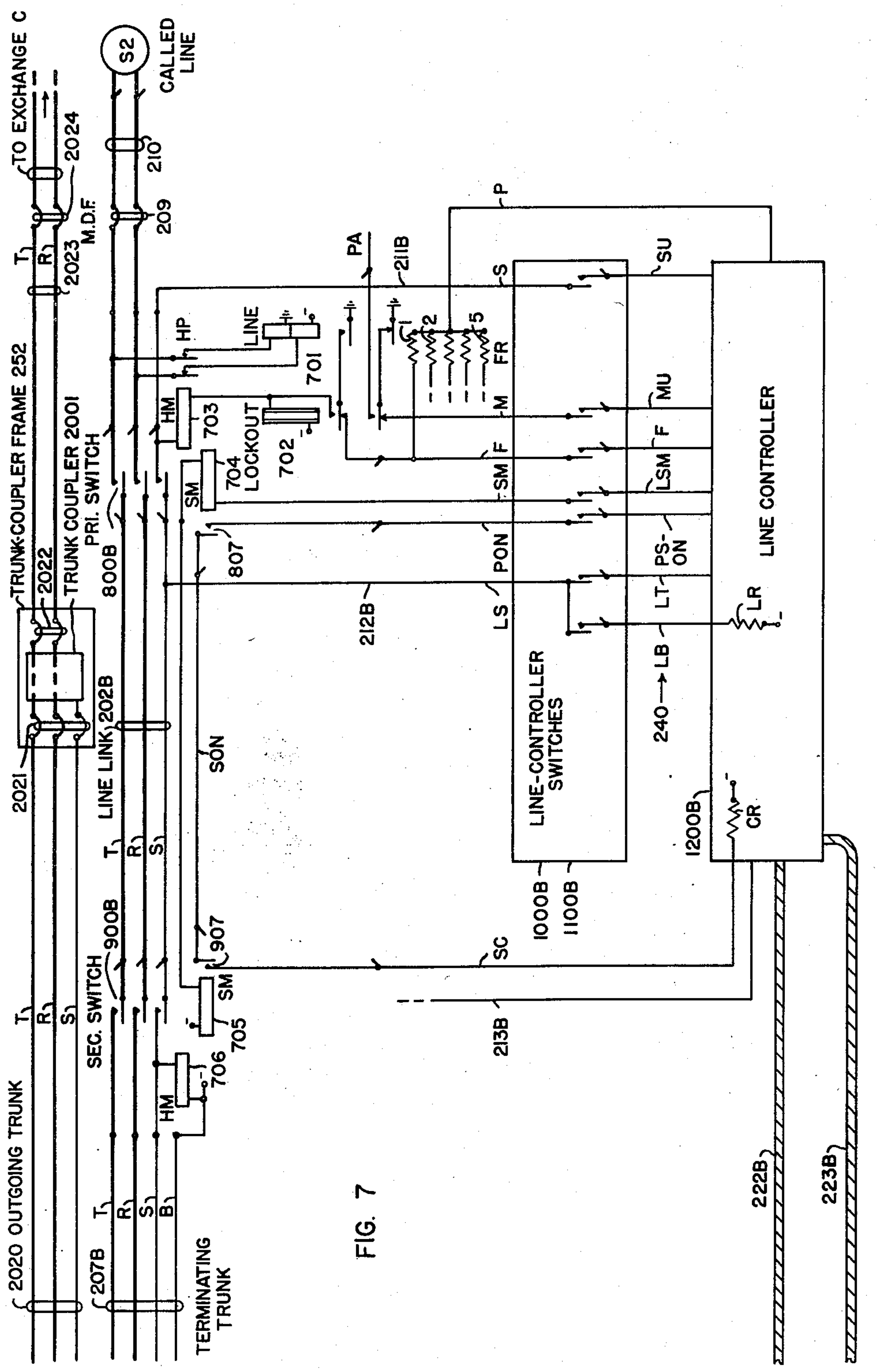
Figure 9:
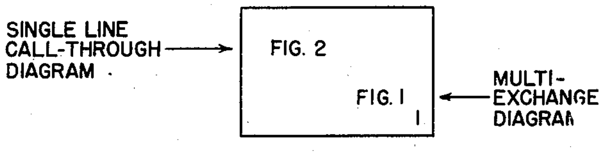
Figure 10:
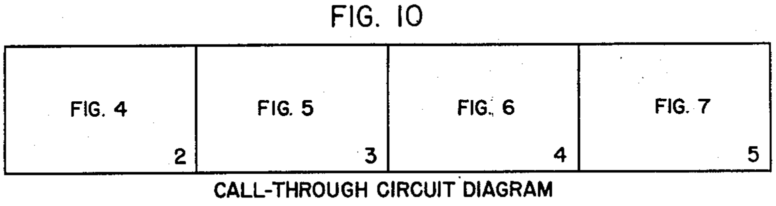
Figure 11:
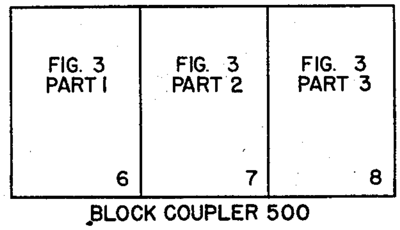
Figure 12:
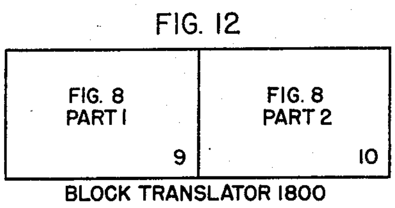

Figs. 4 to 7, taken together, comprise generally a redrawing of Fig. 2 to show in more detail the circuit paths and intimately associated electrical equipment employed in extending the talking connections indicated in Fig. 2; Fig. 4 shows apparatus on line-link frame A of Fig. 2; Fig. 5 is a partial circuit diagram of the block coupler on the block-link frame of Fig. 2; Fig. 6 shows, with some amplification, the remaining apparatus of the block-link frame as shown in Fig. 2; and Fig. 7 shows in more circuit detail the apparatus on line-link frame B of Fig. 2;

Fig. 8 shows the improved block translator, which incorporates the previously noted digit-converting apparatus; and Figs. 9 to 12 show the way in which the sheets of drawings on which Figs. 1 to 8 are drawn, should be arranged in order to be best understood.

B. *General operation*

Fig. 1 shows three exchanges A, B, and C. As indicated, exchanges A and C are each connected with exchange B by trunk lines over which connections in each direction can be established. The apparatus indicated in Fig. 2 is all located in exchange B of Fig. 1.

In Fig. 2, the apparatus of exchange B includes the main distributing frame M. D. F., through which the subscriber lines and the trunks are interconnected with the switchboard apparatus; four line-link frames A, B, C, and D, of which line-link frames A and B are shown at 250A and 250B; a block-link frame shown at 251; and a trunk-coupler frame shown at 252.

The general purpose of the switching apparatus of exchange B is to interconnect the subscriber lines of the exchange with each other, and with the inter-exchange trunk lines, as desired, as well as to interconnect inter-exchange trunk lines as desired.

Considering the line-link frame A, for example, its function is to connect any calling one of the 250 subscriber lines which it serves with an idle one of a group of originating trunks, such as trunk 203A, and to interconnect any of its terminating trunks, such as 207A, with any called one of the subscriber lines connected with the frame. For this purpose line-link frame A is provided with a number of line-link primary switches 800A and a number of line-link secondary switches 900A. The subscriber lines are brought into the primary switches in the manner shown for calling line 200, which is brought in through jumper 201 on the main distributing frame M. D. F. to its own individual vertical location on line-link primary switch 800A.

The originating trunks extend from respective vertical locations on the line-link secondary switches, such as is shown for originating trunk 203A. The terminating trunks are connected to their own respective vertical locations on the line-link secondary switches, such as is shown for terminating trunk 207A. The line-link primary and secondary switches are interconnected by a suitable number of line links, one of which is shown at 202A.

The apparatus on line-link frame A further includes line-controller apparatus comprising line-controller switches 1000A and 1100A, and line controller 1200A. The line-controller switches are 1000A and 1100A, and are interconnected with line controller 1200A by a group of control wires 240A.

The general purpose of the noted line controller apparatus is to control the interconnection of lines with trunks through switches 800A and 900A over two-way line links 202A.

The purpose of the line-controller switches is to interconnect line controller 1200A with any concerned line-link primary switch such as 800A over conductors such as 211A and 212A.

Line-link frame B (shown at 250B) contains apparatus similar to that of line-link frame A. The correspondence is shown by employing the letter B as a suffix for each reference character applied at line-link frame B, whereas the letter A is used as a suffix for each reference character applied at line-link frame A.

The purpose of the block-link frame, shown at 251, is to extend connections received over incoming trunks such as 2085, and over originating trunks such as 203A, to an idle outgoing trung such as 2020 in a called group, or over an idle terminating trunk such as 207B to the line-link frame terminating the called line. For this purpose, the block-link frame is provided with a number of block-link primary switches such as 1300 and with a number of block-link secondary switches such as 1400, interconnected by block links 206.

The incoming and originating trunks such as 2085 and 203A are required to be suitably coupled to the switchboard apparatus at the block-link frame in order that the necessary digit information as to call destination be recorded and acted upon. This general function is assigned to block couplers 500 individual to the respective incoming and originating trunks. Incoming block coupler 500–I is connected individually with incoming trunk 2085 by jumper 204′, while local block coupler 500–L is connected individually with originating trunk 203A through jumper 204. Respective conductor sets 205 extend the incoming and originating trunks 2085 and 203A beyond the block couplers to vertical locations on block-link primary switches 1300.

The outgoing and terminating trunks (such as 2020 and 207B) extend from respective vertical locations on block-link secondary switches 1400.

General control over the primary and secondary switches on the block-link frame is exercised by block controller 1600, as described in the noted former application. When any connection which has reached a block coupler is ready to be extended, block-controller switch 1500 (shown in Fig. 6) operates to connect block controller 1600 to the concerned block-link primary switch such as 1300. The calling block coupler is thereupon connected directly with block controller 1600 through conductors in group 221.

If the call being handled is an outgoing call (one to be completed over an outgoing trunk such as 2020) outgoing controller 1700 is called into play over an initial digit wire in group ID. It is interconnected with the outgoing trunks over respective conductors 227, and is interconnected with the block controller over the conductors in group 241. Its function is to determine which trunks in the called group are idle and to appropriately relay that information to the block controller.

When the connection being handled by the block coupler associated with the block controller is for a called line of the local exchange, hundreds, tens, units, and stations digit information already stored in the block coupler is forwarded to the block translator 1800 over the digit transfer wire group DT.

The general purpose of the block translator is to determine, from the dialed digit information received from any block coupler, which of the four line-link frames A to D terminates the called line, as well as the specific location of the called line on such frame, and to transmit appropriate translated information to the line-controller apparatus on the called line link frame, according to the location of the called line thereon. This information is transmitted over conductors in the concerned one of groups 223A to 223D.

The line-controller apparatus on the called line-link frame acts according to the information received from the block translator to prepare for the extension of the connection to the specific called line. Among other things, this line-controller apparatus identifies the called line-link frame at block controller 1600, following which the block controller and the line-controller apparatus cooperate in extending a connection to the called line over an idle path. The cooperation between the block controller and the line-controller apparatus on the line-link frames is controlled over respective conductor groups 222A to 222D.

B1. *General operation—local calls*

If, for example, the subscriber at station S1 on line 200, desires to call the subscriber at station S2 on line 210, he removes his receiver; waits for dial tone from a local block coupler; and then dials the directory number of station S2, containing five digits, which are termed initial, hundreds, tens, units, and stations digits.

When the receiver is removed at calling station S1, calling line 200 is thereby bridged in the usual manner to operate the usual line relay thereof in exchange B. This results in the operation of line-controller switches 1000A and 1100A to associate line controller 1200A with line-link primary switch 800A at which the calling line terminates. The line links (such as 202A) serving primary switch 800A are thereupon tested by the line controller 1200A over respective conductors 212A, and the associated originating trunks, such as 203A, are tested over respective conductors 213A. From these tests, the line controller matches an idle path for extending the calling line to an idle block coupler, the path over line-link 202A and originating trunk 203A, for example. When this occurs, the line controller causes primary and secondary switches 800A and 900A to effect a mechanical selection of the matched line link 202A, and energizes conductors 211A and 213A to close the appropriate stackups of contact elements in the primary and secondary switches 800A and 900A to extend the calling line over line link 202A to the local block coupler 500–L, to which originating trunk 203A is connected by jumper 204. Line-controller switches 1000A and 1100A, and line controller 1200A are now returned to common use, leaving the calling line 200 connected to local block coupler 500–L by way of line link 202A and originating trunk 203A.

Upon receiving a dial-tone signal over the established connection, from the block coupler 500–L, the subscriber at calling station S1 operates his usual calling device to transmit impulses representing the five digits in the directory number of called station S2. They comprise an initial digit indexing exchange B, and hundreds, tens, units, and stations digits indexing the calling line and the called station S2 thereon. The initial digit is recorded on relay apparatus, and the other digits are recorded on respective digit storage condensers, in block coupler 500–L before any external switchboard action occurs. As soon as the stations digit has been dialed, block-controller switch 1500 associates block controller 1600 with the primary switch 1300 which serves block coupler 500–L. At the same time, block coupler 500–L is associated with block controller 1600 over the conductors in group 221. Also, at the same time, the dialed hundreds, tens, units, and stations digit information is transmitted to block translator 1800 over the respective digit-transfer wires in the wire group DT.

The block translator thereupon determines the line-link frame which serves the called line (line-link frame 250B), and transmits thereto (over conductors in group 223B) translated digit information indicating the primary switch (800B) which serves the called line, and indicating the specific vertical appearance of the called line on that primary switch. When this occurs, line controller 1200B identifies itself at block controller 1600, and exercises a control over conductors in group 240B to cause line-controller switches 1000B and 1100B to position themselves according to the switchboard location of the called line. The line links (such as 202B) serving primary switch 800B are now tested over respective conductors 212B, and the testing information is imparted to block controller 1600 over respective conductors in group 222B. The sleeve conductor 211B of the called line 210, is now extended to block controller 1600 over a conductor in group 222B, enabling the block controller to test the called line to determine its busy or idle condition.

If the called line tests idle, the block controller matches an idle path thereto over a block link such as 206, a terminating trunk such as 207B, and a line link such as 202B. The block links and terminating trunks are tested over respective conductors 225 and 226.

When this available line path between block couper 500–L and the called line has been determined, block controller 1600 closes appropriate select-magnet circuits to effect mechanical selection of block link 206 at primary and secondary switches 1300 and 1400, and to effect mechanical selection of line-link 202B at switches 900B and 800B. When these selections have been made, block controller 1600 operates through a conductor in groups 221 to close the appropriate circuit path through primary switch 1300 to exend the connection to the selected block link 206; operates over conductor 226 to cause the appropriate connection to be closed in secondary switch 1400 to extend block link 206 to terminating trunk 207B, and to cause that trunk to be extended to the selected line link 202B by switch 900B; and operates, over a conductor in group 222B and over sleeve conductor 211B, to cause the appropriate connection to be closed in primary switch 800B to interconnect line link 202B with the called line 210.

Upon the foregoing operations having been completed, local block coupler 500–L begins to apply ringing current to the called line to signal the called station S2 thereon over the established connection across the block-link frame and across the called line-link frame, and the items of common apparatus (block-controller switch 1500, block-controller 1600, block translator 1800, and line-controller apparatus 1000B to 1200B) are promptly returned to common use, leaving the connection intact between the calling and called lines.

When the call has been answered, the subscribers at stations S1 and S2 may converse as described. When both subscribers have replaced their receivers, block coupler 500–L opens front and rear holding circuits which it had previously held closed, whereupon the existing connection is broken at each of the switches 800A, 900A, 1300, 1400, 900B, and 800B.

B2. *General operation—outgoing calls*

When the subscriber at station S1 on line 200 desires to call a subscriber of exchange C, he removes his receiver; waits for dial tone; and then dials the directory number of the subscriber in exchange C. This directory number includes an initial digit having a value assigned specifically to lines of exchange C.

When the receiver is removed at calling station S1, the previously described operations occur on line-link frame A to extend the calling line to an idle block coupler. It may be assumed again that the calling line is extended to block coupler 500–L over line link 202A and originating trunk 203A.

When the initial digit assigned specifically to exchange C is dialed and recorded in block coupler 500–L, a connection is immediately thereupon completed over a wire in initial digit group ID for calling in outgoing controller 1700 and for setting it with specific regard to the trunks in the group leading to the called exchange C. This occurs coincidentally with the association of block coupler 500–L with block controller 1600 over conductors 221, and with the operation of block-controller switch 1500 to associate block controller 1600 with primary switch 1300. When the block controller and outgoing controller are both thus called in together, the block controller is adapted specifically to extend the connection to an idle trunk in the called outgoing group. The circuit arrangements are such that the operations necessary to cause the extension to be made occur with sufficient rapidity that the calling subscriber is not required to introduce an additional delay before proceeding to call the remaining digits in the desired telephone number.

If block link 206 and outgoing trunk 2020 are both idle (as shown by test made over respective conductors 225 and 227) block controller 1600, taking into account information imparted thereto over conductors in group 241, may select that path and condition switches 1300 and 1400 to select block link 206 mechanically. Thereupon, block controller 1600 causes appropriate cross points to be closed in switches 1300 and 1400 to interconnect block-coupler extension conductors 205 with outgoing-trunk conductor 2020 by way of block link 206, thereby extending the calling line through block coupler 500–L, to trunk coupler 2001 on frame 252, and thence through trunk-extension 2023 and jumper 2024 to the trunk conductors outgoing to exchange C. When this occurs, block coupler 500–L "switches through" as will be hereinafter explained, and the connection from the calling line to the outgoing trunk is thereafter held by trunk coupler 2001, which coupler includes apparatus for repeating the succeeding digit impulses over the trunk line to apparatus in exchange C, which may be similar to the switchboard apparatus of exchange B. Coincidental with the "switching through" operation noted for the block coupler, the items of common equipment on the block-link frame (block-controller switch 1500, block controller 1600, and outgoing controller 1700) are disassociated from the established connection and are returned to common use.

The connection established from the calling line to the outgoing trunk is released responsive to operations occurring in trunk coupler 2001 when the receiver is subsequently replaced at the calling station S1.

B3. *General operation—incoming calls*

When exchange B is called from exchange A, the call from exchange A reaches exchange B over an incoming trunk such as that illustrated. This trunk is extended through parts 2082 to 2085 and jumper 204′ to incoming block coupler 500–I, similar to the local block coupler except that it preferably does not apply dial tone upon being taken for use. The trunk line in question may be seized in exchange A by operations previously described in connection with the seizure of a trunk line extending from exchange B to exchange C.

Following seizure of the incoming block coupler, the call may be extended to exchange C by the dialing of the appropriate initial digit at block coupler 500–I or may be extended to any desired called line of exchange B by dialing the appropriate initial digit, followed by the hundreds, tens, units and stations digits in the directory number of the called line and station thereon. The connection may be extended from block coupler 500–I to line 210 conductor group 232 and associated vertical location on primary switch 1300, and thence as hereinbefore described for a locally originated call.

II. DETAILED DESCRIPTION

Referring now in particular to Figs. 4 to 7, a detailed description of the disclosed embodiment will be given.

A. *Locally originated calls* (*Figs. 4 to 7*)

The operations involved in making locally-originated call, as from station S1 on line 200, will now be described with reference to Figs. 4 to 7.

When the receiver (not shown) is removed at calling station S1 of Fig. 4, the usual direct current bridge is closed across tip and ring conductors T and R of line 200, thereby operating line relay 401 through hold pilot contacts HP of the associated hold magnet 403 on line-link primary switch 800A. Line relay 401 applies ground through contacts of lockout relay 402 to mark conductor M individual to the calling line, and to fives conductor F which is common to the five lines constituting the fives group in which the calling line is located.

Grounding fives conductor F applies a ground potential through fives resistor FR–1 to primary conductor P which is common to the twenty-five lines served by primary switch 800A. There are ten such wires P on line-link frame A, a separate one for each line-link primary switch.

Grounding the conductor P illustrated in Fig. 4 causes line controller 1200A to set line-controller switches 1000A and 1100A upon the calling primary switch 800A and with specific reference to the group of five lines including the calling line. Upon being so set, the line-controller switches close the indicated open points therein. Line controller 1200A now matches an idle path from calling line 200 to an originating trunk. This path may be assumed to be over line link 202A to originating trunk 203A. The test circuit for line link 202A from line controller 1200A is from line-test conductor LT through contacts of one of the line-controller switches to link-sleeve wire LS, connected to the sleeve of 202A. The test is for an idle indicating battery potential on the sleeve of the link, which is supplied through the illustrated resistor in the line controller, link-battery wire LB, and contacts of one of the line-controller switches. If line link 202A is busy, holding ground potential thereon masks the resistance-supplied battery potential, causing the link to test busy, but the idle indicating battery potential is effectively received by the line controller when the line link is idle.

When originating trunk 203A (being connected to block coupler 500–L through jumper 204) is idle the line controller 1200A receives an idle indicating battery potential over a circuit path which includes match-test conductor MT–213A through the left hand winding of hold magnet 406, sleeve conductor S of originating trunk 203A, contacts 1 of release relay 305, and resistor 332. On the other hand, when originating trunk 203A is in use, the idle indicating battery potential on its sleeve conductor S is replaced by ground potential.

Upon matching a path over line link 202A to originating trunk 203A, line controller 1200A grounds link-select magnet wire LSM closing a circuit through contacts of one of the line-controller switches and over select-magnet wire SM for primary and secondary select magnets 404 and 405 which are associated with the primary end and with the secondary end respectively of line link 202A. Select magnets 404 and 405 thereupon operate to effect mechanical selection of link 202A at primary switch 800A and at secondary switch 900A. When select magnets 404 and 405 have both operated to effect the noted selection, battery potential from resistor CR in line controller 1200A is extended through contacts of magnets 405 and 404 and contacts of one of the line-controller switches to the primary-secondary off-normal wire PS–ON leading to the line controller.

Upon receiving battery potential over wire PS–ON, line controller 1200A operates hold magnets 403 and 406 to extend the calling line over the selected line link 202A to the matched originating trunk 203A. Hold magnet 403 is operated by the line controller upon the application of ground potential to the illustrated sleeve-units conductor SU, which is extended through contacts of one of the line-controller switches to sleeve conductor S–211A (an extension of sleeve conductor S of the calling line), and thence to battery through hold magnet 403 and lockout relay 402 in series. Upon operating, hold magnet 403 closes the illustrated stackup of contacts of primary switch 800A to extend calling line 200 to line link 202A. Additionally, it opens its illustrated hold-pilot contacts HP to disconnect line relay 401 (in the manner of the usual cutoff relay), whereupon line relay 401 restores.

Lockout relay 402, upon operating in series with hold magnet 403, prepares for placing the associated line in lockout condition if called upon so to do.

Line controller 1200A operates hold magnet 406 by applying ground potential directly to match-test conductor MT–213A, closing a circuit through the left-hand winding of hold magnet HM and thence to battery through the resistor 332 in block coupler 500–L over the previously traced path. Upon operating, hold magnet 406 connects conductors T, R, and S of line link 202A respectively to the corresponding conductors of originating trunk 203A, completing the extension of the calling line to the calling trunk. At the same time, hold magnet 406 locks to ground on its right-hand winding to sleeve conductor S of trunk 203A. Initially the locking ground on the sleeve wire is maintained on the left-hand winding of hold magnet 406 and over the sleeve conductor controlling the line. The line controller 1200A maintains the operate circuits of magnets 403 and 406 closed for an interval sufficient to permit the seized block coupler 500–L to return holding ground over the sleeve conductor of the seized originating trunk 203A. Shortly thereafter, line controller 1200A clears out and permits line-controller switches 1100A and 1000A to clear out, leaving the extended connection held by ground applied to the sleeve conductor thereof by the seized block coupler.

When block coupler 500–L (shown schematically in Fig. 5 and in circuit detail in Fig. 3) is seized by the described extension of a connection thereto from calling line 200, over line-link 202A, originating trunk 203A, and jumper 204, line relay 303 operates over the calling line, through contacts 1 and 2 of relays 301 and 302.

Line relay 303, at its front contact 2, operates release relay 305 through contacts 5 of relay 301. At its contacts 1, release relay 305 transfers the sleeve conductors of originating trunk 203A from battery through resistor 332 to holding ground. The established connection, from the calling line to the block coupler, is thereby maintained after the line-controller apparatus of Fig. 4 has cleared out.

As hereinafter described in this application, dial tone is placed on the calling line informing the calling subscriber that the desired number now may be dialed. The dialing of the initial digit sets register DR in accordance therewith. This setting determines whether the call is local or outgoing.

A1. *Outgoing calls*

If an outgoing call is being made, as to exchange C, this fact is marked by the setting of register DR to select the desired group of outgoing trunks. Thereupon, the common control apparatus is rendered temporarily individual to the calling block coupler; the block-controller switch 1500 is positioned on the primary switch 1300 which serves the calling block coupler; and the single digit of stored information is transmitted to the outgoing controller. The outgoing controller 1700 and the block controller 1600 now act together pursuant to matching a path across the block-link frame to an idle outgoing trunk in the called group.

If trunk 2020 is idle, an idle path may be matched thereto over a block link such as 206U of the pair illustrated in Fig. 6. The idle condition of trunk 2020 is indicated in the outgoing controller 1700 by idle-indicating battery potential normally applied to sleeve conductor S of trunk 2020 by trunk coupler 2001 and reaching the outgoing controller through the left-hand winding of hold magnet HM17 and match-test conductor MT–227. The busy or idle condition of block links such as 206U and 206L is determined by the block controller over respective sleeve conductors 225 extended thereto through contacts of the block-controller switch 1500. Sleeve resistors RU and RL are connected respectively to conductors 225 by the block-controller switch, thereby applying idle-indicating battery potential to each of them subject to being masked by ground potential thereon, at any block link which is actually in use.

When the path over items 206U and 2020 has been determined by the matching operation of controllers 1600 and 1700, block controller 1600 closes a circuit through contacts of block-controller switch 1500 and over select-magnet wire SM of principal select magnets 605 and 606 in series. In order to effect selection of the matched upper link 206U of the illustrated pair, as distinct from the lower link 206L thereof, block controller 1600 closes a circuit from ground through the upper auxiliary select magnet SMU–604 of primary switch 1300 over the associated wire SMU and contacts of the block controller switch, conductors and contacts in the block controller, wire SMU leading to switch 1400, and thence to battery through the upper auxiliary select magnet SMU–607. Auxiliary magnet 604 and 607 thereupon operate to complete the mechanical selection of link 206U.

An off-normal or pilot circuit now extends from ground through off-normal contacts controlled in common by auxiliary select magnets 603 and 604 of switch 1300, contacts of any one of the ten principal magnets 605, primary off-normal conductor PON, contacts controlled by any one of the ten principal select magnets 606, contacts controlled in common by auxiliary select magnet 607 and 608, and thence over secondary off-normal contacts SON to block controller 1600.

Upon receiving ground as noted over the associated conductor SON, block controller 1600 closes circuits to effect the extension of the connection through switches 1300 and 1400. Closure of the switch 1400 is responsive to the application of ground potential to match-test conductor MT–227 by the block controller thereby closing a circuit through the left-hand winding of hold magnet 609 and thence over sleeve conductor S of outgoing trunk 2020 to battery in trunk coupler 2001. Hold magnet 609 thereupon locks its right-hand winding to the associated sleeve conductor S, at the same time closing its principal stackup (vertically aligned with magnet 606) which partially extends both block links of the illustrated pairs, and closing its upper auxiliary stackup U (aligned with select magnet 607) to extend the conductor T, R, and S, of block link 206U respectively to conductors T, R, and S of the matched outgoing trunk 2020.

The circuit closed by block controller 1600 for effecting closure of the matched connection at primary switch 1300 is over circuit elements, not shown herein, to switching conductor SW of Fig. 5, and thence to battery through the right-hand winding of hold magnet HM2–602. Magnet 602 locks its left-hand winding to ground on the associated sleeve conductor S of extension group 205, and at the same time closes its associated principal and auxiliary stackups selected respectively by magnets 605 and 604. Conductors T, R, and S in group 205 are thereby extended respectively to conductors T, R, and S in block link 206U, and thence through secondary switch 1400 as stated to the coresponding conductors in outgoing trunk 2020.

Hold magnet 602 grounds hold-pilot wire HP in group 205, thereby closing an operate circuit (not shown) for switch-through relay 301 of block coupler 500–L.

At its contacts 1 and 2, relay 301 switches the tip and ring conductors of the attached originating trunk through metallically to conductors T and R of extension group 205, now extended across the block-link frame to the trunk coupler 2001 (Fig. 7) associated with the seized outgoing trunk. The line and release relays (not shown) thereupon operate in the seized trunk coupler, whereby holding ground is applied to the sleeve wire at that point to maintain the extended connection.

Line and release relays 303 and 305 of the block coupler now restore, leaving the established connection held by the seized trunk coupler.

The impulses constituting the remaining digits in the called number are repeated in the usual manner at trunk coupler 2001 of Fig. 7.

When trunk coupler 2001 on the seized outgoing trunk clears out, responsive to the receiver being replaced on the calling line, it responds in the usual manner to remove ground potential from the sleeve conductor of the established connection, thereby breaking down the connection by releasing the primary and secondary hold magnets 602 and 609 on the block link frame and lockout relay 402 and hold magnets 403 and 406 (Fig. 4) on the line-link frame. The release of primary hold magnet 602 on the block-link frame ungrounds the associated conductor HP to release switch-through relay 301 of coupler 500–L, thereby clearing out the block coupler as hereinafter described.

A2. *Terminating calls*

Following the described seizure of block coupler 500–L, if the initial digit dialed and registered on the digit register DR is the one which indexes the local block of one thousand line numbers, it is followed by hundreds, tens, units, and stations digits which are registered on digit register DR in turn and stored on the digit storage condensers HC, TC, UC, and SC, respectively.

Upon receiving the extended digit information, the block translator transmits a suitably translated version of the hundreds, tens, and units digits to the line controller on the line-link frame at which the called line terminates. The station-digit information is used for ringing-control and station-intercept purposes as explained in the noted former application.

If the illustrated station S2 is the one called, it is served by line-link frame B which includes apparatus shown in Fig. 7. In this event, the translated digit information is sent to line controller 1200B over conductors in cable 223B.

On receiving the translated digit information indicating which primary switch (primary switch 800B, Fig. 7) serves the line being called, and indicating the fives and units location of the called line thereon, line controller 1200B identifies itself at block controller 1600 by a signal transmitted over a conductor in group 222B and positions line-controller switches 1000B and 1100B in accordance with line-link primary switch 800B and in accordance with the fives group thereon in which the called line is located.

When switches 1000B and 1100B have been set, one of them extends the sleeve conductor S–211B of the called line over sleeve-units wire SU–240B to line controller 1200B, whence it is extended over a conductor in cable 222B to the block controller 1600 to enable the called line to be tested as to its busy or idle condition. At the same time, each of the ten link sleeves associated with the called primary switch 800B is connected to the line controller through one of the line-controller switches. For example, the sleeve of the illustrated link is connected through link-sleeve wire LS–212B and link-test wire LT. Link resistor LR is connected to this sleeve conductor over conductor LB and other contacts of the line-controller switches to provide an idle-indicating test potential on the sleeve of the link unless the link is in use. The busy or idle condition of the line link serving primary switch 800B is separately indicated to block controller 1600 over respective conductors in cable 222B.

On testing the called line, if block controller 1600 finds it busy, or finds that no idle path can be matched thereto, the block controller operates the busy relay (not shown) in block coupler 500–L which applies busy-tone current to the calling line.

If an idle path can be matched to the called line, and if the called line is idle, the block controller matches a path thereto, such as over block link 206U (Fig. 6), terminating trunk 207B, and line link 202B.

Block ling 206U is selected mechanically at switches 1300 and 1400 by the operation of select magnets 604 to 607 as described, whereupon they cooperate to ground conductor SON as described to signal the block controller 1600.

Line link 202B is selected mechanically by the operation of select magnets SM–705 and SM–704. Their circuit is closed at the block controller over a wire in cable 222B, through line controller 1200B, wire LSM, a contact pair of one of the line-controller switches, the associated select-magnet wire SM, and thence to battery through magnets 704 and 705 in series.

With magnets 705 and 704 operated, a signal is transmitted to the block controller over a circuit path from battery at control resistor CR of the line controller 1200B, series contacts of magnets 705 and 704, contacts of a line-controller switch, associated wire PS–ON, and thence to the block controller over a wire in cable 222B.

Upon receiving the noted signals that the select magnets have operated on the block-link and line-link frames, block controller 1600 grounds the sleeve of the called line 210 (Fig. 7) over the noted test extensions thereof, thereby operating hold magnet HM–703 in series with lockout relay 702. Magnet 703 disconnects line relay 701 and connects the called line to the selected line-link 202B. Block controller 1600 also grounds the sleeve wire of the matched terminating trunk 207B (by way of wire MT–226), thereby operating magnet HM1–610 on the block-link frame and secondary hold magnet HM–706 on the line-link frame. Block link 206U is thereby extended over conductors T, R, and S of trunk 207B to line link 202B. Block controller 1600 also grounds its terminating switching wire to close a path over circuit elements (not shown) in coupler 500–L, and thence over the associated wire SW, to operate primary hold magnet HS2–602 to complete the connection over the matched path to the called line. Hold magnet HM2–602 also closes its local contacts to ground hold-pilot conductor HP, thereby operating the switching relay (not shown) in the block coupler to free the common apparatus, and to apply ringing current to the called line over a circuit path only partially shown, but which includes the line winding of ring-cutoff relay 307.

When the call is answered, relay 307 operates in the usual manner to open the ringing circuit and close the talking path through condensers 321 and 322.

If the called subscriber (at station S2, Fig. 7) is the first to replace this receiver at the end of the conversation, back-bridge relay 302 thereupon restores, reversing current flow over the calling line back to normal direction.

When the receiver is replaced on the calling line, line relay 303 restores and (at its make contact 2) open-circuits release relay 305, which restores a moment later, removing ground potential (at its make contact 2) from the sleeve conductor S of the established connection. The established connection is thereby cleared out, by the release of the primary and secondary hold magnets 403 and 405 on the calling line-link frame, the primary and secondary hold magnets 602 and 610 on the block-link frame, and the secondary and primary hold magnets 706 and 703 on the called line-link frame.

A3. *Reverting calls*

To make a reverting call (call another station on the same line with the calling station), the calling subscriber removes his receiver; responds to dial tone by dialing the regular directory number of the called station; replaces his receiver upon hearing a distinctive reverting-call tone prompting him so to do; waits a reasonable time for ringing current to be applied to the line to signal the called station; and then again removes his receiver for conversation. It may be assumed, for the purpose of this description, that the subscriber at station S1 has become connected to block coupler 500–L as described, and has dialed the number of another station on calling line 200.

When block coupler 500–L is used for a reverting call, its operation is as described for a terminating call, up to the point when the common apparatus on the block-link frame has been called in, after the complete number has been stored on the digit storage condensers HC to SC.

In the present example, since the number dialed is that of a line (200) served by line-link frame A as shown in Fig. 4, block translator 1800 sends the translated equivalent of the hundreds, tens, and units digits of the called number over wires in cable 223A to line controller 1200A, which responds as described for line controller 1200B to set line controller switches 1100A and 1100B appropriately, thereby closing a test extension of sleeve conductor S of the called (and calling) line 200 to the block controller 1600 over conductor S–211A, line-controller contacts, conductor 240A, and a wire in cable 222A.

The holding ground maintained on the sleeve of calling line 200 by block coupler 500–L causes that line to test busy when the block controller 1600 tests it over the described extended sleeve connection. Before treating the called line as normally busy when it tests busy as stated, the block controller applies a reverting-call test to the called line as described in the former application, operating the reverting-call relay (not shown) in the block coupler when the reverting-call test so indicates.

When the noted reverting-call relay is operated in the block coupler, no forward connection is closed, but switch-through relay 301 is operated to cause ringing current to flow back to the calling line, to signal the called substation thereon, as described in the former application.

B. *Incoming calls*

Incoming trunk 2083 extends over jumpers 2084 to conductor set 2085, which is connected through jumpers 204' to incoming coupler 500–I. On seizure of trunk 2083 at exchange A, coupler 500–I is prepared for operation as described for the similar coupler 500–L. Connections through coupler 500–I are extended by way of conductor group 232, upon operation of hold magnet 601, as explained for coupler 500–L and hold magnet 602.

C. *Block coupler 500–L*

The local block coupler 500–L of Figs. 2, 3, and 5 will now be describetd in detail with reference to Fig. 3. It includes a test jack TJ; relays 301 to 319; magnetic impulse counters SE and DR; digit-storage condensers HC, TC, UC, and SC; condensers 321 to 323; and resistors 331 to 339, interconnected as shown in Fig. 3.

C1. *Seizure*

When block coupler 500–L is seized by the described extension of a connection thereto from calling line 200 over line-link 202–A, originating trunk 203–A, and jumper 204, line relay 303 operates over the calling line, through contacts 1 and 2 of relays 301 and 302. Line relay 303 at its contacts 2 operates release relay 305 through contacts 5 of relay 301. At its contacts 1, release relay 305 transfers the sleeve conductor of the originating trunk 203–A from battery through resistor 332, break contacts 1 of SE and relay 315, wire 345 and closed contacts 1 of test jack TJ, to holding ground through closed contacts 3 of relay 314 and contacts 2 of relay 311. The established connection, from the calling line to the block coupler, is thereby maintained after the line controller apparatus of Fig. 4 has cleared out.

At its contacts 2 release relay 305 grounds the local locking conductor 368, whereby ground is extended through contacts 7 of relay 307, closed contacts 8 of relay 309, wire 355, closed contacts 5 of relay 516 and over wire 356 to operate trunk relay 317. Relay 305 at its contacts 3, opens a point in the release pulse circuit and prepares the local impulse circuit for the digit register DR through closed contacts 5 of relay 310 and wire 359.

Line relay 303 at its contacts 1, closes a circuit for series relay 304 through contacts 5 of relay 307. Relay 304 operates after a momentary interval and at its contacts 1 places dial tone upon the calling line from the common dial tone lead through the small capacity tone-coupling condenser 323; at its contacts 6, grounds the common tone start lead to start the tone apparatus if it is not already operated; at its contacts 3, connects time pickup relay 311 to the common time pulse lead TP to start the normal time out period; and at its break contacts 4 removes ground from wire 354, thereby preparing relay 315 for operation in series with resistor 333; and at its make contacts 3 prepares the impulse path for the operation of the sequence device SE.

C2. *Receipt of digit pulses*

On hearing the noted dial tone signal, the calling subscriber dials the digits of the directory number of the called line or station.

Each time the dialing device is operated to transmit a series of circuit interruption impulses, line relay 303 is restored momentarily for each such interruption impulse in a series, comprising from 1 to 10 impulses, depending upon the digit dialed.

Release relay 305 remains operated throughout any series of impulse-induced restorations of line relay 303, being slow restoring because of its indicated copper sleeve.

Series relay 304 restores promptly upon the first restoration of line relay 303. Being slow operating because of a comparatively inductive and a comparatively heavy biasing spring adjustment, relay 304 remains restored throughout the digit series of momentary restorations of the line relay 303.

With release relay 305 maintained continuously operated, each restoration of line relay 303 delivers an impulse at its break contacts 2, through make contacts 3 of relay 305, break contacts 5 of relay 310, and over wire 359 to the operate winding of the digit register DR.

When line relay 303 comes to rest, operative at the end of any digit series of impulses, series relay 304 shortly reoperates, responsive to the continued closure of its circuit.

C3. *Initial digit registration*

When the impulses of the initial digit are delivered over wire 359 to the operate winding of the digit register DR as described, the contact sets (1 to 10) of this register are actuated successively responsive respectively to the impulses of the digit.

On receipt of the first impulse at DR, its break contacts 1 disconnect the dial tone lead to prevent reapplication of dial tone upon the reoperation of series relay 304, and make contacts 1 prepare the operate path for the release-pulse relay 315.

C4. *Absorbing initial digit 1*

Block coupler 500–L is arranged to absorb the initial digit 1 as many times as dialed or otherwise produced, as by improper hookswitch operation or by line trouble. Accordingly, the digit 1 is unassignable as an effective initial digit. When the initial digit received contains only a single impulse, the first contact set is the only set operated on the digit register DR. Then ground is extended through make contacts 2 of the operated trunk relay 317, over wire R1 of the ten digit register wires, make contacts 2 of digit register DR, make contacts 14 of relay 317, over wire 353, break contacts 5 of sequence device SE, and over wire 360 to the open contacts 2 of release-pulse relay 315, preparatory to closing a neutralizing current circuit for the impulse counters SE and DR. At the end of digit series of impulses, series relay 304 operates, removing ground from wire 354 at its break contacts 4, thereby opening a short circuiting path about the winding of relay 315 and allowing relay 315 to operate after a momentary interval due to the heavy adjustment of the biasing spring. The operation of relay 315 extends the previously traced ground on wire 360 through make contacts 2 of relay 315, resistor 334, break contacts 2 of relay 316 to the neutralizing windings of the impulse devices SE and DR. Upon the neutralization or clearing of the digit register DR, contacts 1 open, breaking the operate path for the release-pulse relay 315, thereby opening the neutralizing current path. The release of the digit register DR also reapplies dial tone to the calling line as a signal that the calling subscriber should start dialing from the beginning.

C5. *Outgoing calls*

On the dialing of any initial digit 2 to 0, the register DR, through contacts of the trunk relay 317, makes a connection with the corresponding of nine initial digit leads ID–2 to ID–10 which extend to the outgoing controller. One of these leads (ID–6 in the illustrated embodiment) corresponds to the initial digit assigned to the one thousand block of local line numbers, and is rendered ineffective at the trunking relay 317. In the illustrated embodiment wire ID–6 is left disconnected from the back contacts 7 of relay 317 and the local control wire 362 is connected in place of wire ID–6. The remaining ID leads may correspond to respective groups of outgoing trunks, and extend to the block controller through the respective initial digit relays of the outgoing controller.

When the initial digit dialed is the one assigned to a group of outgoing trunks such as those outgoing to exchange C, the reoperation of series relay 304 at the end of the digit impulse train closes the outgoing chain at its contacts 5 to extend marking ground to the outgoing controller over the corresponding leads ID–2 to ID–10. This operation is subject to the outgoing chain being idle, in which case ground potential is present on the outgoing chain-in conductor of block coupler 500–L. This conductor is referred to as OTG–CH–IN incoming from the block controller switch. This wire originates at one of the section preference relays of the block controller switch and as indicated in Fig. 3, part 2. This conductor extends through the chain contacts of all of the block couplers of this section to the outgoing-chain-end conductor OTG–CH–END, which is multipled to all couplers of this section. Ground potential on conductor OTG–CH–IN now passes through closed contacts 4 of relay 313 to the winding of 313 and extends through contacts 6 of relay 310, contacts 6 of relay 301, contacts 5 of relay 304, wire 364, closed contacts 15 of relay 317, and wire 350 to the digit register DR. With register DR set according to an outgoing group (such as to exchange C) the ground on wire 350 is thereby extended to the selected one of the initial digit leads ID–2 to ID–10 through contacts 3 to 11 of relay 317. The outgoing chain circuit is thus extended through a series marking relay in the outgoing controller to battery through the outgoing start relay of the block controller.

The last mentioned relays operate (1) to mark the called group in the outgoing controller (2) to inform the block controller that an outgoing call has been received. The outgoing controller thereupon informs the block controller as to a busy or idle condition of each of the outgoing trunks in the called group, while the block controller proceeds to match a path across the block link frame to an idle one of them.

In the outgoing chain relays associated with the block controller switch, the concerned section preference relay operates to open the outgoing chain to all other block coupler sections, and to condition the block controller switch to select the block link primary switch which serves the block link frame containing the calling coupler as set forth in the noted former application.

In the calling block coupler 500–L, outgoing chain relay 312 operates in the previously traced circuit to lock itself to the outgoing-chain-in conductor OTG–CH–IN (at its make contacts 4) and at its break contacts 4 and 5 it isolates the associated chain-end conductor OTG–CH–END from the chain, to guard the outgoing chain from seizure by any other block coupler in the same section, whereby the control apparatus on the block link frame is rendered temporarily individual to block coupler 500–L.

Outgoing chain relay 312 at its contacts 3 and 6, connect the common outgoing busy and switching wires (OTG–BU and OTG–SW) to the local wires of this coupler, and at its contacts 1 it closes a non-operating priming circuit for switch-through relay 301.

If no outgoing trunk in the called group is available (as when all trunks in the called group are busy or when no match is possible to any one of them), or if an unassigned initial digit has been dialed the block controller grounds the common wire OTG–BU, operating busy relay 310 of the block coupler through contacts 6 of relay 312. Relay 310 locks itself to grounded conductor 368; opens the outgoing chain at its contacts 6 to release the outgoing chain relay 312, thereby freeing the seized outgoing chain, the outgoing controller, and the block controller; opens impulse wire 359 at its contacts 5 to prevent further registration if further digits are dialed; at its contacts 2 it shunts contacts 3 of series relay 304 which connect up time pickup relay 311, thereby avoiding release of relay 311 (if operated) to start a new time out period in the event of further dialings; and it applies an outgoing busy tone to the calling line from its busy tone wire OTG–BT, through break contacts 1 of the local relay 316, make contacts 1 of busy relay 310 and through the tone coupling condenser 323.

The calling subscriber is expected to replace his receiver upon hearing the distinctive outgoing busy tone, to thereby initiate the normal release of the connection. Otherwise the connection times out as later described.

Upon seizure of the trunk outgoing to the designated exchange as described in the noted former application, ground is extended by the hold pilot wire HP to operate switch-through relay 301. Switch-through relay 301 operates promptly because of its pre-existing partial energization through the priming resistor 331 controlled by contacts 1 of relay 312. Upon operating, switch-through relay 301 opens the closed outgoing chain at its contacts 6, thereby initiating the clearing out of the common apparatus and restoring the outgoing chain relay 312. At its contacts 1 and 2 relay 301 switches the tip and ring conductors of the attached originating trunk through metallically to conductors T and R extended over the block link frame to the trunk coupler associated with the outgoing trunk. The line and release relays thereupon operate in the seized trunk coupler, whereby holding ground is applied to the sleeve wire at that point to maintain the extended connection.

Line relay 303 of the block coupler is disconnected and restored by the described switch-through operation, whereupon relay 304 promptly restores. After a slight interval release relay 305 restores and removes the local holding ground connection on the sleeve conductor, leaving the established connection held by the trunk coupler. Relay 301 is the only relay held operated in block coupler 500–L. The impulses constituting the remaining digits of the called number are repeated at the trunk coupler as described in the noted former application.

When the trunk coupler on the seized outgoing trunk clears out, responsive to the receiver being replaced on the calling line, it removes ground potential from the sleeve connection of the established connection, thereby breaking down the connection by releasing the primary and secondary hold magnets 602 and 609 (Fig. 6) on the line link frame and lockout relay 402 and hold magnet 403 and 406 (Fig. 4) on the line-link frame. The release of primary hold magnet 602 on the block link frame ungrounds the associated conductor HP to release switch-through relay 301 of coupler 500–L.

Release pulse relay 315 is now operated by ground being extended through contacts 4 of relay 301, wire 344, and make contacts 1 of the digit register DR to energize the series connected neutralizing windings of SE and DR as described, thereupon releasing the operated counters SE and DR. Digit register DR opens circuits relay 315, which shortly restores, thereby completing the clearing out of the block coupler 500–L.

C6. *Terminating calls*

When following the described seizure of block coupler 500–L, the initial digit dialed is the digit 6, serving as a thousands digit to index the local block of one thousand line numbers, the corresponding initial digit lead ID–6 (Fig. 3, part 2) stands open at the trunk relay 317 wherefore the outgoing chain relay 312 is not operated and none of the common equipment is taken for use at this time.

Series relay 304 operates a moment after the completion of the dialing of the initial digit 6 to remove ground from wire 354 at its break contacts 4, thereby removing the short circuiting path about the winding of relay 315 to operate release-pulse relay 315, and at its make contacts 4 extending ground from wire 368 through break contacts 6 of relay 307, over wire 351, make contacts 13 of relay 317, break contacts 7 and operated contacts 6 of the digit register DR, make contacts 7 of relay 317, over wire 362, make contacts 5 of relay 315 to operate local relay 316. Ground is also extended through break contacts 3 of relay 316, for the slow operate interval of relay 315, to step the sequence device SE. Relay 316 locks itself to ground extended over wire 352 at its contacts 4; at its contacts 3 prepares an operate path for subsequent stepping of sequence device SE from wire 351; transfers ground on wire 355 at its contacts 5 from trunk relay 317, over wire 356, to mark relay 318, over wire 357 through the now closed contacts 12 of relay 317; at its contacts 2 prepares the neutralizing-current path effective only on digit register DR; and at its contacts 1 transfers wire 341 from the outgoing-busy tone lead OTG–BT to the terminating-busy tone lead TER–BT.

Operated contact set 1 of the sequence device SE, at the break contacts, disconnects idle indicating battery resistor 332 and at its make contacts connects the hundreds digit storage condenser HC to the charging wire 349 preparatory to receiving the following dialed digit information.

In the inter-digit interval following the initial, hundreds, tens, and units digits (ID, H, T, and U respectively) the digit register DR is released in preparation for the receipt of the succeeding digit.

Release-pulse relay 315 is operated, by the removal of ground from wire 354, upon the reoperation of series relay 304, provided the make contacts of the contact set 1 on digit register DR are off-normal (operated). The closure of contacts 5 of release pulse relay 315 completing the previously traced operate path of local relay 316 is effective to operate relay 316 only following the locally indexed initial digit (ID6) whereupon relay 316 locks to ground as heretofore described. Relay 316 at its contacts 2 renders the neutralizing-current path only effective on the neutralizing or upper winding of the digit register DR. One relay operation later (relay 318 operated by relay 316), ground is extended through contacts 14 of mark relay 318, over wire 353, through closed contacts 5 of the sequence device SE, over wire 360 to the closed contacts 2 of release pulse relay 315, through current-limiting resistor 334, make contacts 2 of local relay 316, the upper winding of DR to battery, to complete the neutralizing current path. Upon release, digit register DR opens the make contacts of contact set 1 to restore release-pulse relay 315, to thereupon limit the duration of the neutralizing-current pulse. Dial tone is not reapplied to the calling line by the closure of break contacts 1 of the digit register DR as the restoration of trunk relay 317 opens the dial-tone lead at its contacts 1.

Digit register DR stands released and awaiting the receipt of the next dialed digit.

The dialing of the locally indexed initial digit is followed by dialing the hundreds, tens, units and stations digit of the called number.

Operation of local relay 315, as previously described, operates mark relay 318. Relay 318 at its contacts 1 through 10 connect the ten digit mark wires (DM–1 to DM–0) to the digit register wires (R–1 to R–0); opens the operate path of relay 319 at contacts 11; at its contacts 12 and 13 connect wires 365 and 366 to wire 350; places ground on wire 353 at its contacts 14; and at its contacts 15 connects wire 350 to wire 361 to complete the digit-storage-condenser charging-current path.

Digit mark wires (DM–1 to DM–0), multipled to all block-couplers from the block translator extend the ten digit mark potentials to the digit register through contacts 1 to 10 of relay 318. The digit mark wire and its corresponding digit mark potential represent the digits according to the following table:

| Digit | Wire | Potential |
|---|---|---|
| 1 | DM–1 | −40 volts. |
| 2 | DM–2 | −36 volts. |
| 3 | DM–3 | −32 volts. |
| 4 | DM–4 | −28 volts. |
| 5 | DM–5 | −24 volts. |
| 6 | DM–6 | −20 volts. |
| 7 | DM–7 | −16 volts. |
| 8 | DM–8 | −12 volts. |
| 9 | DM–9 | −8 volts. |
| 0 | DM–0 | −4 volts. |

Line induced impulses of the dialed directory number are received by the operate or lower winding of the digit register DR over wire 359. The number of contact sets operated on the digit register DR, at the completion of the series of impulses, correspond to the number of impulses of the dialed digit. Upon receipt of the first impulse of a series of impulses, contact set 1 operates thereby performing the function heretofore described. The following line induced impulses progressively operate the following contact sets (one set for each impulse) of the digit register DR. As the digit register DR steps in response to the line induced impulses of the dialed digit, digit-mark potentials extending from digit mark wires DM–1 to DM–0 to register wires R–1 to R–0, are further extended over wire 361 (by way of wires 350, 365, and 366), contacts 4 of relay 315, current-limiting resistor 335, and wire 349 to the sequence device SE. Sequence device SE extends the potentials to the digit-storage-condenser (HC, TC, UC, or SC), corresponding to the digit being dialed (i. e. hundreds, tens, units, or stations digits respectively).

At the completion of the dialing of a digit (the hundreds digit for example) the reoperation of the series relay 304 at its make contacts 4 extends ground through break contacts 6 of relay 307 over wire 351, through contacts 3 of relay 315, through make contacts 3 of relay 316 to the operate (lower) winding of the sequence device SE to operate the next contact set, thereby preparing the following digit storage condenser for receipt of the subsequently dialed digit potential. The sequence device SE advances to the next contact set with each reoperation of the series relay. The time interval for which ground is extended to the operate winding of the sequence device SE is controlled by the release pulse relay 315 at its break contacts 3. A moment after the reoperation of series relay 304, the release-pulse relay 315 operates (as previously discussed) to open a point in the operate path of the sequence device SE; and to release the digit register DR upon the completion of each of the hundreds, tens, units digits.

At the completion of the stations digit series of impulses the sequence device upon operating contact set 5, at its break contacts, disconnects grounded wire 353 from wire 360 to open a point in the release-pulse path, thereby preventing the release of the digit register DR upon operation of relay 315.

When sequence device SE takes its fifth step, at the end of the dialing of the stations digit, make contacts 5 connects the common terminating start wire TER–ST, extended from the block controller, to wire 346 to prepare the operate path for the terminating-chain relay 313. If the terminating-chain is closed in associated apparatus (including other block-couplers in the section), external to the block-coupler as described in the noted former application, ground potential is extended by the terminating-chain-in (TER–CH–IN) conductor (from the block controller) through chain contacts 2 and 3 of relay 313 (of each coupler in the section) to the end conductor of the chain, TER–CH–END, which is common to all couplers of the section. The ground on the TER–CH–END conductor is now extended through closed contacts 2 and the winding of relay 313, contacts 3 and 4 of relays 310 and 309, make contacts 5 of the sequence device SE to the terminating start wire TER–ST. Wire TER–ST extends to battery through the terminating-start relay in the block controller, which now operates to prepare the block controller for handling a locally terminating call.

Over the above traced circuit, the concerned section preference relay is operated to set the block controller switch on block link primary switch 1300, and to guard the common terminating chain against seizure at any other block coupler section. Terminating chain relay 313 is operated in the traced circuit in this block coupler to seize the terminating chain and to guard it against seizure by any other coupler in the same section, by locking itself (at its make first contacts 2) to the associated chain-in wire, and isolating TER–CH–END from the chain at break contacts 2 and 3.

Terminating chain auxiliary relay 314, at its break contacts 3 disconnects the sleeve conductor S of the attached originating trunk from ground through closed contacts 2 of relay 311, and at its make contacts 3 transfers it to ground on sleeve ground conductor SG of the block controller, pursuant to the reverting call test; at its contacts 2, 8, 9, and 10 respectively it connects up terminating switch wire TER–SW reverting call wire RC, terminating busy wire TER–BU of the block controller and ring reverse wire RR of the block translator.

Terminating chain auxiliary relay 314 forwards the stored digit information by connecting at its contacts 4 to 7 the four digit transfer wires DT (H, T, U, and ST) to the digit storage condensers HC, TC, UC, and SC (the hundreds, tens, units, and stations storage condensers respectively) through the serially related discharge current limiting resistors 336 to 339 respectively. The discharge current limiting resistors (336 to 339) minimize the intermingling of charges in the event two or more couplers should be seized simultaneously, thereby resulting in erroneous translation. The translation of the stored digit potentials to index the desired line and station on that line, will hereinafter be described.

If any station digit 0, 1, 2, 3, or 4 has been dialed, ring-reverse relay 306 does not operate, but it is operated by the block translator (over the ring-reverse wire RR) is the station digit information received thereby shows that any stations digit 5 to 9 has been dialed. When it is thus operated, relay 306 reverses the ringing leads at contacts 1 and 2 and at its contacts 3 it prepares to lock itself to ground through contacts 7 and 5 of relays 309 and 307.

On testing the called line as described in the noted former application, if the block controller finds a called line busy, or finds that no idle path can be matched thereto, the block controller grounds its terminating busy lead TER–BU, thereby operating busy relay 310 in the block coupler through contacts 8 of relay 314. Relay 310, at its contacts 4, over wire 347 locks itself to ground on wire 368, through break contacts 6 of the sequence device SE and wire 348; opens its contacts 3 to release terminating chain relay 313 and to free the terminating chain; closes its contacts 2 to shunt the make contacts 3 of relay 304 which controls the time pickup relay 311, to avoid starting a new time out period in the event of subscriber dialing; and closes its contact 1 to apply busy-tone current to the calling line from the busy tone wire TER–BT through contacts 1 of the local relay 316; at its break contacts 5 disconnects wire 359 to prevent further registration of dial impulses.

If the calling subscriber does not replace his receiver in response to the terminating busy tone signal to thereby cause the connection to be cleared out normally, the connection is cleared out under the control of the timing apparatus at the end of the normal time-out period, measured from the dialing of the station digit as described in the noted former application.

If the called line is idle, and if an idle path can be matched thereto, the block controller matches such a path, such as over block link 206U (Fig. 6), terminating trunk 207B, and line link 202B.

Block link 206U is selected mechanically at switches 1300 and 1400 by the operation of select magnets 604 to 607 as described, whereupon they cooperate to ground conductor SON as described to signal the block controller 1600.

Line link 202B is selected mechanically by the operation of select magnets SM–705 and SM–704. Their circuit is closed at the block controller over a wire in cable 222B, through line controller 1200B, wire LSM, a contact pair of one of the line-controller switches, the associated select-magnet wire SM, and thence to battery through magnets 704 and 705 in series.

With magnets 705 and 704 operated, a signal is transmitted to block controller over a circuit path from battery at control resistor CR of the line controller 1200B, series contacts of magnets 705 and 704, contacts of a line-controller switch, associated wire PS–ON, and thence to the block controller over a wire in cable 222B.

Upon receiving the noted signals that the select magnets have operated on the block-link and line-link frames, block controller 1600 grounds the sleeve of the called line 210 (Fig. 7) over the noted test extensions thereof, thereby operating hold magnet HM–703 in series with lockout relay 702. Magnet 703 disconnects line relay 701 and connects the called line to the selected line link 202B. Block controller 1600 also grounds the sleeve wire of the matched terminating trunk 207B (by way of wire MT–226), thereby operating magnet HM1–610 on the block-link frame and secondary hold magnet HM–706 on the line-link frame. Block link 206U is thereby extended over conductors T, R, and S of trunk 207B to line link 202B.

Block controller 1600 also grounds switching wire TER–SW, closing a circuit through contacts 2 of relay 314, and over conductor SW extending therefrom to operate the associated primary hold magnet HM2–602 to complete the connection over the matched path to the called line. Hold magnet HM2–602 also closes its local contact to ground hold pilot conductor HP, which operates switching relay 309 through make contacts 1 of terminating-chain auxiliary relay 314.

Upon operating, switching relay 309 opens its contacts 4 to restore relay 313 and free the terminating chain and common apparatus. Contacts 3 of relay 309 shunt contacts 3 of relay 304 to prevent a starting of a new time out period in the event of further dialing; its contacts 9 ground the common generator start lead GEN–ST to start the ringing interrupter and the generator apparatus if this is not already in operation; its contacts 7 complete the locking circuit of relay 306, if operated; its contacts 8 transfer ground from relay 318 to wire 358, over which ground is extended to relay 319, which upon operating connects the ten interrupted generator wires INT–GEN1 to 0 to the register wires R1 to R0. Contacts 5 and 6 close the ringing circuit to the called line; and its contacts 1 apply ringing tone to the calling line from the common lead RT through contacts 1 of relay 308 and 307, and through tone coupling condenser 323. Intermittent tone is sent back to the calling line from the lead RT to inform the calling subscriber that the ringing operation has begun.

The block couplers and their associated common ringing apparatus provide for accommodating up to ten harmonic ringing stations either bridged or divided ringing, on any party line by (1) employing a one-ring code and a two-ring code for each of the five frequencies of ringing current, and (2) by ringing over one line wire or the other according to the station called as shown in the following ringing chart:

RINGING CHART

| Stations Digit | Frequency | |
|---|---|---|
| 0 | 1 | |
| 1 | 2 | |
| 2 | 3 | 1 short on tip wire. |
| 3 | 4 | |
| 4 | 5 | |
| 5 | 1 | |
| 6 | 2 | |
| 7 | 3 | 2 shorts on ring wire. |
| 8 | 4 | |
| 9 | 5 | |

The ringing circuit is from the selected one of the ten generator leads INT–GEN–0 to INT–GEN–9, through the make contacts 1 to 10 of the ring relay 319, associated register wire R–1 to R–0, the associated contacts of the digit register DR, wire 366 and 365 connected by contacts 11 and 12, respectively, of relay 319 to wire 350 through contacts 13 of relay 319, conductor 363 to the line winding of ring cutoff relay 207, make contacts 6 of relay 309, whence it passes on to the tip conductor of the called line (if stations digit 0 to 4 have been dialed and ring reverse relay 306 is therefore not operated) through break contacts 2 of relay 306 and 307, or to the ring conductor R of the called line (if stations digits 5 to 9 have been dialed and ring reverse relay 306 is consequently operated), through make contacts 2 of relay 306 and break contacts 3 of relay 307.

A return path to ground for the transmitted ringing current is provided (1) over the ring conductor R (when relay 306 is not operated), through break contacts 3 and 1 of relays 306 and 307, and make contacts 5 of relay 309 to the common generator ground conductor GEN–GRD, or (2) over tip conductor T (when relay 306 is operated) through break contacts 2 of relay 307, make contacts 2 of relay 306 through make contacts 5 of relay 309 to conductor GEN–GRD.

Ring cutoff relay 307, whose line winding is included in the ringing circuit does not operate before the call is answered, for each ringer (not shown) on the called line has the usual condenser in series therewith to block D. C. flow, and because the shading collar surrounding the armature end of the core of relay 307 keeps it from responding to the alternating ringing current.

In order to permit ring cutoff relay 307 to be operated by direct current flow during the application of ringing current (if the call is then answered), any applied frequency of current is in series with (superimposed on) the usual grounded exchange battery. Preferably, during the silent period battery alone is applied to each of the generator leads (INT–GEN–0 to INT–GEN–9) rather than generator current in series with the exchange battery.

When the call is answered at the called station S2 on line 210 (Fig. 7), the closure of the usual talking bridge across the called line causes direct current to flow thereover from the generator lead in use, operating ring cutoff relay 307 through its line windings sufficiently to close its preliminary make self-locking contacts 4. These contacts close a local self-locking circuit for operating relay 307 fully.

At its contacts 1, relay 307 opens a point in the ring tone lead; at its contacts 2 and 3 opens the ringing circuit and completes the talking circuit; at its contacts 5 removes ground from wire 367 thereby restoring the series relay 304 and ring-reverse relay 306 (if operated); at its contacts 6 transfers sequence device pulsing wire 351 from the series relay controlled ground to the time pickup lead TP; its contacts 7 open a point in the operate path to restore local relay 316 and ring relay 319; and at its contacts 9 removes ground from the generator start lead GEN–ST.

Back bridge relay 302 now operates over the called line. It interchanges the incoming tip and ring conductors to reverse the current flow over the calling line to serve any required supervisory function, and at its break contacts 3, it disconnects wire 342 from wire 343 and therefore restores time pickup relay 311 (if operated) to cancel the normal time out period, which has been running since the completion of dialing. During conversation the following five relays of block coupler 500–L are energized:

1. Back bridge relay 302.
2. Line relay 303.
3. Release relay 305.
4. Ring cutoff relay 307.
5. Switching relay 309.

If the called subscriber (at station S2, Fig. 7) is the first to replace his receiver at the end of the conversation, back bridge relay 302 thereupon restores, reversing current flow over the calling line back to normal direction and reconnecting relay 311 to start a new normal time out period.

When the receiver is replaced on the calling line, line relay 303 restores and (at its make contacts 2) open circuits release relay 305, which restore a moment later, removing ground potenial (at its make contacts 1) from the sleeve conductor of the established connection. The established connection is thereby cleared out by the release of the primary and secondary hold magnets 403 and 405 (Fig. 4) on the calling line link frame. The primary and secondary hold magnets 602 and 610 (Fig. 6) on the block link frame, and the secondary and primary hold magnets 706 and 703 (Fig. 7) on the called line link frame. The release of primary hold magnet 602 on a block link frame ungrounds conductor HP, restoring switching relay 309.

Release relay 305 also removes ground from wire 368 to restore ring cutoff relay 307 and removes ground from the lower end of resistor 333 allowing the release pulse relay 315 to operate as previously described. Relay 315 completes the neutralizing-current path to release the counter SE and DR. The neutralizing-current path for clearout extends from ground through contacts 5 of relay 301 through break contacts 2 of relay 303, break contacts 3 of relay 305, over wire 360, the now operated contacts 2 of relay 315, the series current-limiting resistor 334, break contacts 2 of relay 316, the upper or neutralizing winding of the sequence device SE, and the neutralizing winding of the digit register DR to battery. Upon the release of digit register DR the make contacts 1 open to restore release pulse relay 315, thus completing the clearing out of the block coupler.

C7. *Reverting call*

To make a reverting call (call another station on the same line with the calling station) the calling subscriber removes his receiver; responds to dial tone by dialing the regular directory number of the called station; replaces his receiver upon hearing a distinctive reverting-call tone prompting him to do so; waits a reasonable time for ringing current to be applied to the line to signal the called station; and then again removes his receiver for conversation. It may be assumed for the purpose of this description that the subscriber at station S1 had become connected to block coupler 500–L as previously described and had dialed the number of another station on the calling line 200. When block coupler 500–L is used for a reverting call, its operation is as described in a terminating call, up to the point when the common apparatus on the block link frame has been called in, after the complete number has been dialed and registered, on the digit storage condensers HC to SC. This includes the operation of a terminating chain auxiliary relay 314 which, among other things, make the described substitution at its contacts 3 of the grounded sleeve ground conductor SG of the block controller for the local source of holding ground normally applied to the sleeve conductor S incoming to the block coupler 500–L.

In the present example, since the number dialed is that of a line (200) served by a line link frame A as shown in Fig. 4, the block translator sends the translated equivalent of the hundreds, tens, units digits of the called number over wire in cable 223A to the line controller, which responds as described in the noted former application to set the line controller switches appropriately, thereby closing a test extension of sleeve conductor S of the called and calling line 200 to the block controller over conductor S–211A, line controller contacts, conductor 240A and a wire in cable 222A.

The holding ground maintained on the sleeve of calling line 200 by block coupler 500–1 causes that line to test busy when the block controller tests it over the described extended sleeve connection. Before treating the calling line as busy when it tests busy as stated, the block controller inserts a resistor in series with sleeve ground wire SG. Since ground is now being held on sleeve conductor S of the connections over wire SG, through make contacts 3 of relay 314, a partial battery potential is thereby caused to appear on the sleeve conductor S of the calling line. The appearance of this potential on the line being tested characterizes the call as being a reverting call.

Reverting-call ringing is a ring-back process not requiring a connection forward from the block coupler. Therefore, the block controller now performs no matching operation, but forthwith grounds its switching conductor SW and reverting-call conductor RC, thereby operating reverting-call relay 308 along with primary hold magnet 602 (Fig. 6) on the block link frame. Since matching has not occurred, no select magnet is operated at switch 1300 (Fig. 6). Therefore, hold magnet 602 operates only its hold-pilot contacts (shown immediately to the left thereof), grounding wire HP to operate switching relay 309.

Relay 309 restores relay 314 by restoring relay 313, therewith freeing the terminating chain; closes the ringing circuit through the unextended outgoing tip and ring conductors T and R of the coupler; and performs its other previously noted functions. Reverting-call relay 308 at its contacts 3, locks itself to the operating ground of relay 309; at its contacts 4, it closes a holding circuit for relay 305 through contacts 8 of ring-cutoff relay 307, to lock the connection against release during the reverting-call ringing; and at its make contacts 1, places reverting-call tone on the called line from tone conductor RCT to prompt the calling subscriber to replace his receiver to initiate the reverting call ringing.

When the receiver is replaced on the calling line, line relay 303 and series relay 304 restore, but release relay 305 is held operated through contacts 8 and 4 of relays 307 and 308.

Relay 304, at its closed contacts 2, operate switch-through relay 301 through make contacts 2 of relay 308. Relay 301, at its contacts 1 and 2, inverts the block coupler for operation as a ring back source, by disconnecting the incoming tip and ring conductors from their normal input connection and transferring them to the unextended outgoing tip and ring conductors. The ringing current applied to such unextended outgoing conductors as previously described (through contacts of the operated switch relay 309) is now extended back to the calling line to signal the called station thereon.

The relays now operated in the block coupler (during the reverting call ringing) are relays 301, 305, 309, 316, and 319 and (if the registered station digit is 5 to 9) 306.

When the receiver is removed at the called station on line 200, or when it is removed at the calling station S1 after the elapse of sufficient time for reverting call ringing to have occurred, ring cutoff relay 307 is operated over the subscriber line. It locks itself to ground on conductor 346; at its contacts 7 restores relay 316 and 319; at its contacts 5 restores relay 304 and relay 306 (if operated); at its contacts 2 and 3 it disconnects the ringing circuit and substitutes back bridge relay 302, which operates but only momentarily, as described in the noted former application.

Relay 307 also opens the holding circuit of release relay 305, which restores after a slight interval to remove holding ground from the associated sleeve conductors. This operation clears out the connection by opening the holding circuit of hold magnet 403, 406, and 602. Magnet 602 ungrounds the associated conductor HP releasing relays 308 and 309.

Relay 308 releases relay 301, whereupon release pulse relay 315 is operated as previously described to deliver a neutralizing impulse to the impulse counters SE and DR, and is restored by the release of the digit register DR.

Block coupler 500–L is again at its normal condition.

At the line-link primary switch 800A, Fig. 4, when ground is removed from the sleeve conductor S of the established connection, slow restoring lockout relay 402 is still operated when hold magnet 403 restores and reconnects line relay 401. Ordinarily, this operation occurs with the associated line unbridged, wherefore line relay 401 does not respond, and relay 402 restores after its momentary delay interval. But, line 200 is now bridged at one or both of the calling and called stations thereon, wherefore line relay 401 immediately reoperates upon being reconnected.

At its inner contacts, line relay 401 locks relay 402 operated, and the locking ground passes through the winding of hold magnet 403 to the associated sleeve conductor S to mark the line busy during the reverting-call conversation. At the lower front contacts of relays 401 and 402, ground is placed on the common permanent-alarm conductor PA as a signal that at least one line is bridged or grounded, and stands thereby locked out of normal service.

When the reverting-call conversation is terminated, and receivers have been replaced at both stations, relays 401 and 402 restore successively, terminating the locked-out condition of line 200.

C8. *Permanent timing.*

Permanent timing starts in block coupler 500–L when series relay 304 is first operated by line relay 303 upon seizure of the coupler. Contacts 3 of relay 304 (to which relay 311 is normally connected by contacts 3 of relay 302) connect relay 311 to conductor TP through contacts 3 of relay 311.

A variable pickup interval starts with the noted operation of relay 304, and lasts until the time-out timer next reaches its pickup or starting position. This pre-pickup interval, for a two minute timer, ranges from zero to two minutes, depending upon where the timer is within its cycle when relay 304 operates. The variable pre-pickup period begins with operation of relay 304 and lasts until relay 311 operates.

If relay 304 is still operated when the timer reaches its pickup position, the consequent grounding of lead TP (by the timer) operates time pickup relay 311 (through break contacts 3 of relay 311, make contacts 3 of relay 304, and break contacts 3 of relay 302). At its make contacts 3, relay 311 locks to ground locally and disconnects its winding from the temporarily grounded lead TP, and at its contacts 2 it transfers incoming sleeve conductor S from its local source of holding ground to the normally grounded time hold conductor TH.

If series relay 304 remains operated continuously (for lack of dialing), time pickup relay 311 is still held locked operated when the timer next reaches its time out position. Then the noted temporary ungrounding of conductor TH by the timer removes holding ground from the sleeve conductor S of block coupler 500–L. The connection is thereby cleared out; the calling line is locked out of service until cleared (as previously described); and the block coupler is released and returned to common use.

If relay 304 is restored (as previously described) by the dialing of a digit before the common timer reaches its time out position, time pickup relay 311 is thereby released, and a new normal time out period starts on the next reoperation of relay 304, at the end of the dialed digit.

On a locally-terminated call, a similar normal time-out period runs following the dialing of remaining succeeding digits in the called number, starting with the consequent reoperation of relay 304.

When a busy condition is encountered, on either a locally-terminated or an outgoing call, busy relay 310 shunts the time pickup contacts 3 of relay 304 (in the circuit of relay 311), whereby the connection is released thereafter at the end of the current normal time-out period even though the calling subscriber should temporarily restore relay 304 by dialing while the busy tone signal is being supplied.

When switching relay 309 operates to start the ringing period, (on a normal terminating call or on a reverting call) it similarly shunts the last named contacts of relay 304 to cause the invariable release of the connection if ringing is still in process at the end of the normal time-out period.

When a normal terminating call is rendered, back bridge relay 302 at its contacts 3 disconnects relay 311 to cancel permanent timing during conversation, but when the called subscriber replaces his receiver ahead of the calling subscriber relay 302 restores and recloses its contacts 3 to start a new time out period, provided the connection is still held by the called line.

C9. *Conversation timing*

When a normal terminating call is answered, and the conversation starts (relays 307 and 302 operated) contacts 3 of back-bridge relay 302 disconnects the permanent timing circuit of time pickup relay 311 (as above noted) to cancel permanent timing during conversation. At its contacts 6, relay 307 starts the conversation timing period by transferring the operating or lower winding of counter SE to time pulse lead TP. This transfer occurs with counter SE in its fifth position (contact sets 1 to 5 operated).

The conversation-timing time-out period comprises a variable pickup interval, followed by five cycles of common timer. If a two minute timer is used, the pickup interval ranges from 0 to 2 minutes, and the following five-cycle interval is ten minutes.

When the common timer next reaches its pickup position it transmits an impulse over leap TP to the operate windings of SE (through make contacts 6 of relay 307, and contacts 3 of relay 315 and make contacts 3 of relay 316). This pickup pulse advances device SE to its sixth position (operates its contacts 6), thereby beginning the fixed five cycle conversation-timing interval. Break contacts 6 of SE open a point in the locking circuit of busy relay 310, and make contacts 6 of SE prepare to operate relay 310 from conductor TW during the final cycle of the timing period.

The next four pulses on lead TP advance device SE to its seventh, eighth, ninth, and tenth positions respectively.

When device SE is driven to its tenth (final) position, it shunts the time disconnect contacts 3 of the operated back bridge relay 302 (over wire 342 and wire 343), whereupon time pickup relay 311 operates on the same time pulse and locks as described. At its make contacts 2, relay 311 renders a source of holding ground, from time-hold conductor TH, on the sleeve conductor of the connection, thereby starting the fifth and final one-cycle interval of the fixed conversation time period.

If the connection is still maintained during the final one-cycle interval, then when the common timer reaches its warning position (half a minute for its cutoff position), a short application of ground to time warn conductor TW operates busy relay 310 (through make contacts 1 of relay 311, and make contacts 6 of device SE) to place a temporary application of busy-tone current to the talking path from the busy-tone lead TER–BT, through make contacts 1 of relays 316 and 310, and condenser 323. The conversing subscribers are thereby warned that the connection will shortly be released. Busy relay 310 does not lock itself operated at this time because break contacts 6 of SE are open.

If the conversation is still in progress when the common timer next reaches its time out position, it results in a momentary ungrounding of conductor TH which removes ground potential from the sleeve conductor of the connection, thereby clearing out the connection and causing both involved lines to be locked out, as described for line 200 until the receivers are replaced thereon.

D. *Block translator 1800* (*Fig. 8*)

The block translator 1800 of Figs. 2, 6, and 8, is shown in circuit detail in Fig. 8 to the extent that it differs from the block translator 1800 of the noted former application.

It comprises (1) overriding-translation portion 880, (2) registers HR, TR, UR, and SR, and (3) fixed-translation portion 890.

Of these parts, only hundreds register HR is shown in circuit detail, along with hold relay 800, common to the four registers HR to SR.

The hundreds register HR comprises ten relays 8A0 to 8A9, and the respectively corresponding control triodes 810 and 801 to 809. Each of the registers TR, UR, and SR, is similar to register HR, except that the relays thereof may have the respective work contacts and associated circuit connections as shown in the noted former application.

As described in the noted former application, when the block translator 1600 is individualized with a block coupler, upon the operation of its terminating-chain relay (such as relay 313 of the block coupler 500–L, Fig. 3), the terminating start relay of the block controller 1600 is operated. As shown in Fig. 6 terminating start relay 16A6 grounds hold wire 1861, leading to the translator 1600. Thereupon, hold relay 800 (Fig. 8) operates.

Relay 800 at its contacts 1 to 4 grounds local locking wires 851 to 854 respectively and at its contacts 5 to 8 extends the anode supply wire 870 to wires 855 to 858 respectively.

Terminating auxiliary relay 314 of the block coupler, being slow operating, transfers the stored digit potentials over digit transfer wires in cable DT to the block translator a moment after the operation of relay 800.

The translator register relay sections respond to the digit mark potentials incoming over the four digit transfer wires DT (H, U, T, and ST respectively) from the block coupler to index the called line and station on that line.

The four register-relay sections respond in a like manner (upon the operation of register control relay 800) to the incoming digit mark potentials to perform the functions assigned, as disclosed in the noted former application.

The hundreds register-relay section (Fig. 8, part 1) as hereinafter described, includes register-relays 8A0 to 8A9; control tubes 801 to 810; control grid-current-limiting resistors 811 to 820; grid leak resistor 830; and anode resistors 840 to 849.

The cathodes of the ten control tubes (801 to 810) are connected respectively to successive taps on the exchange battery, by the wires DM–1 to DM–10 of cable DM which are multipled to all block couplers, the taps being so arranged to provide a like potential (4 volts) between adjacent taps. The cathode of control tube 801 is connected to the most negative tap (−40 volts) and the cathode of control tube 810 is connected to the least negative tap (−4 volts).

The control-grids of the ten control tubes are connected, through a series connected grid current limiting resistor, to a common input wire 859. Static bias is placed on the control grids by connecting input wire 859 through a grid-leak resistor of high value to the negative pole of the exchange battery (−48 volts). The static bias thus placed on the control-grids is sufficient to hold the ten control tubes in the cut-off or non-conductive state.

The anode circuit of the control tube includes the lower winding of the associated register-relay serially connected between the anode and the anode current-limiting resistor. The ten anode current-limiting resistors 840 to 849 connect to the common anode supply wire 855 through respective chain contacts 4 of relays 8A0 to 8A9.

The battery-connected upper winding of relays 8A0 to 8A9 is an auxiliary operate and hold winding. Ground is extended to this winding over the local locking ground wire 854 and the chained break contacts 3 to the preliminary make contacts 3. Preliminary make contacts 3 respond to a small current in the anode circuit of the control tubes 801 to 810. Upon the closure of make contacts 3, the auxiliary operate winding is energized and assumes the relay spring load, and locks to local ground through make contacts 3. Upon complete operation, break contacts 3 opens the local grounding circuit, and opens the contacts 4 in the anode supply circuit to prevent operation of relays lower in the chain i. e., with relay 8A7 operated, relays 8A1 to 8A6 are isolated.

Digit mark potentials incoming to the hundreds register-relay section over the digit transfer wire DT–H, are impressed on the control grids of control tubes 801 to 810 by way of input wire 859. By way of example, assume that hundreds digit to be registered to be the digit 7, represented by the potential −16 volts as assigned in the previously described block-coupler. As the control grids of all tubes assume the potential of the input wire 859, control tubes 801 to 807 are biased to allow conduction while control tubes 808 to 810 remain in the cutoff or non-conducting condition. Resistors 811 to 816 protect the control grids of the associated control tubes from damage, as they are biased positive and therefore draw grid current. Control tube 807 with zero bias (cathode and control-grid are at like potentials) conducts to allow sufficient current flow to cause register-relay 8A7 to respond.

Relay 8A7 at its preliminary make contacts 3 locks to local locking ground wire 854 through the series connected break contacts 3 of relays 8A8, 8A9 and 8A0; at break contacts 4 opens the anode supply to the control tubes lower in the chain i. e., 801 to 806; extends ground at contacts 1 over wire H–7 of cable DF–1 to the detector field; at its contacts 2 connects wire 7 of cable 1833 to wire P of cable 1831; and at its contacts 5 grounds wire 5 of cable 1836.

The operated contacts as above described complete the necessary circuits to thereby perform the functions of the block translator as described in the noted former application.

Upon operation of switching relay 309 or busy relay 310 of the block coupler, a point in the operate path of the terminating chain relay 313 is opened. Thus relay 313, relay 314, the associated section preference relay, and terminating start relay 16A6 restore.

The restoration of relay 16A6 at its contacts 2 permits the restoration of hold relay 800 by opening the operate circuit.

Upon restoration of relay 800, ground and the anode supply potentials are removed from the register relay sections, thus restoring the operated relays.

The block translator is now free to become associated with any waiting coupler.

We claim:

1. In a digit-signal storage and indicating system, a digit-storage device including a storage condenser, a digit-indicating device, more than two control conductors and means for maintaining respective fixed direct-current potentials thereon with respect to each other, means for selecting a pair of said conductors according to the identity of a digit signal to be stored and for connecting said condenser temporarily between the selected conductors to charge the condenser to the fixed potential existing between them, means for connecting the charged condenser to the digit-indicating device, means in the last said device for measuring the potential of the charged condenser, and means including said measuring means for indicating the identity of the stored digit signal.

2. In a system according to claim 1, said control conductors being extended to both the storage device and the indicating device, said measuring means including means for comparing the potential of the charged condenser with the potentials among the said control conductors.

3. In a system according to claim 1, said control conductors being extended to both the storage device and the indicating device, said measuring means including means for comparing the potential of the charged condenser simultaneously with the respective potentials between a selected one of the control conductors and each of the other control conductors.

4. In a digit-signal storage and indicating system, a digit-storage device including a storage condenser, a digit-indicating device, a reference conductor, control conductors and means for maintaining respective fixed direct-current potentials thereon with respect to said reference conductor, means in the digit-storage device for charging said control condenser to any desired one of a number of potentials according to the identity of a selected digit signal to be stored, means for connecting the charged condenser to the digit-indicating device, means in the last said device for comparing the potential of the charged condenser with the said potentials between the reference conductor and the respective control conductors, and means including said comparing means for indicating the identity of the stored digit signal.

5. In a system according to claim 4, said means for comparing including means for comparing the potential of the charged condenser simultaneously with the potentials between the reference conductor and the respective control conductors.

6. In a digit-signal storage system, control conductors corresponding respectively to differing numbers of pulses in a digit series of pulses, means for maintaining the control conductors at respective fixed direct-current potentials with respect to each other, a storage condenser, a register and means for operating it step-by-step as the pulses of a digit series are received, and means in said register for connecting the said storage condenser to a predetermined pair of the control conductors responsive to the first pulse of a series and for transferring it to other pairs of the control conductors in succession according to the number of impulses in the series, whereby the condenser is charged to a given potential upon the receipt of the first pulse of the series, and is charged to a new and different potential on the receipt of each new pulse of a series comprising more than one pulse.

7. In a digit-signal indicating system, a register, a translator, a reference conductor and a digit conductor extending from the register to the translator, means in the register for placing any one of a number of direct-current digit potentials on the digit conductor with respect to the reference conductor, each such digit potential corresponding to a separate digit value, triodes in the translator corresponding respectively to said digit values, each triode including a cathode, an anode, and a control electrode, means including a current source for passing current serially through the cathode and anode of each triode of a value dependent upon the bias potential between the cathode and control electrode thereof, means for applying a separate normal bias potential effectively between the cathode and control electrode of each triode, said normal bias potentials being related to the potential of said reference conductor and being graded in value in respective correspondence with said digit potentials, means coupling said digit wire to all said control electrodes, whereby a potential corresponding to the potential placed on the digit wire in the register appears on the control electrode of each triode to affect the normal bias potential between the cathode and control electrode thereof, the said normal bias potentials being so related to said digit potentials that current flows effectively through the anode and cathode of a different number, from one to all, of said triodes for each digit potential placed on said digit wire, and means in the translator for indicating the digit value of any said digit potential placed on the digit wire by the register according to the number of said triodes passing effective current through the anode and cathode thereof.

8. In a system according to claim 7, the said means for applying the separate normal biases at the respective triodes comprising a group of control conductors and means for maintaining respective direct-current potentials thereon with respect to the said reference conductor, each said cathode being connected to a separate one of said control conductors.

9. In a system according to claim 8, one of the said control conductors comprising a common bias-control conductor having a potential lying to one side of the range of potentials covered by the said control conductors that are connected to respective cathodes, and a high-resistance connection leading from said one control conductor to each control electrode for overcoming all of the separate normal bias potentials when no digit potential is present on said digit wire.

10. In a system according to claim 9, the said means for coupling the digit wire to the control electrodes comprising a direct-current connection from the digit wire to any control electrode, said common bias-control conductor having a potential sufficiently more negative than the other control conductors that all triodes are biased to carry less than an effective flow of current through the anode and cathode thereof when no digit potential is present on the control wire.

11. In a system according to claim 7, the said means for coupling the digit wire to the control electrodes comprising a direct-current connection from the digit wire to any control electrode.

12. In a system according to claim 11, each of the said direct current connections including a series resistor effective to limit control-electrode current in such triodes as are so biased by the potential on the digit wire as draw such current.

13. In a system according to claim 7, the said means for indicating the digit value of any said digit potential comprising relays responsive respectively to the flow of current through the cathode and anode elements of the triodes, and interlocking circuit means controlled by the relays for preventing more than one of them from responding effectively to any digit-value potential on the digit wire.

14. In a system according to claim 7, the said means for indicating the digit value of any said digit potential comprising relays responsive respectively to the flow of current through the cathode and anode elements of the triodes, and circuit means controlled by the relays for locking any one of them in its position of response incidental to said indication of a digit value by the relays.

15. In a system according to claim 14, means for subsequently nullifying the said circuit means for locking to permit any locked relay to restore.

16. In a switching system, switchboard apparatus, trunks leading thereto, lines leading therefrom having respective multi-digit numbers assigned thereto, each trunk having a separate group of storage condensers associated therewith, the condensers of any such group corresponding respectively to the successive digits in any one of said numbers, means for taking any said trunk for use and for transmitting thereover successive digit signals indicative respectively of the digits in the number of any desired called one of said lines, means responsive to the said digit signals for charging said storage condensers of the last said trunk, each to a potential indicative of the digit value of the corresponding digit signal, a translator common to all said trunks and lines, means for temporarily individualizing said translator with any said trunk which has received and stored a said number on its storage condensers, digit registers in the translator and means for setting them respectively in accordance with the potentials to which the storage condensers of the last said trunk have been charged, switching means, and means including the translator for operating the switching means in accordance with the settings of the said digit registers to extend a connection from the last said trunk to the desired called line.

17. In a switching system according to claim 16, the said means for charging any said condenser including a group of digit-marking conductors extended in multiple to the apparatus of each said trunk and to said translator, said charging means further including means for maintaining said conductors at respective fixed direct-current potential with respect to each other and means for temporarily connecting any such condenser between selected ones of said conductors according to the potential to which it is to be charged, and each said digit register in the translator including means for ascertaining the potential to which any corresponding said condenser has been charged by comparing that potential with the potentials among said digit-marking conductors.

18. In a switching system, switching apparatus, a first trunk, groups of other trunks, a group of lines, a digit register associated with the first trunk, means for initially operating said register over the first trunk to assume any desired one of a number of digit positions, certain of said positions indexing said groups of other trunks respectively, while another position indexes said group of lines, means responsive to said register being operated to assume any said trunk-group indexing position for operating said switching apparatus to connect the first trunk to an idle trunk in the indexed group, means responsive to said register being operated to assume said line-group indexing position for recording that the line group has been indexed, means controlled by the recording means for restoring the register and for preparing it to register succeeding digits in the number of any desired called one of said lines by respective reoperations and interspersed restorations of the register, digit storage devices for storing digit signals indicative respectively of the positions assumed by the register on its said reoperations, and means controlled by the storage devices for operating said switching apparatus to extend a connection from the first trunk to said called line according to the said stored digit signals.

19. In a switching system according to claim 18, the said means responsive to the first operation of the register comprising control wires connected to respective positions of the register and relays respectively controllable thereover, said storage devices each comprising a condenser for storing charges of potentials corresponding respectively to the digit positions of the register, charging wires of respective potentials, and means controlled by the said recording means for disconnecting the control wires from the register and for substituting the said charging wires.

20. In a switching system according to claim 18, a sequence device for associating the said storage devices with the register in succession as it is reoperated to register digits succeeding the first, and means controlled by the said recording means for rendering the sequence device operative to effect the said association.

No references cited.